(12) United States Patent
Loidl et al.

(10) Patent No.: US 8,174,447 B2
(45) Date of Patent: May 8, 2012

(54) CONCEPT FOR LOCALIZING A POSITION ON A PATH

(75) Inventors: Karin Loidl, Senden (DE); Steffen Meyer, Erlangen (DE); Juergen Hupp, Nuremberg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 505 days.

(21) Appl. No.: 12/441,984

(22) PCT Filed: Sep. 4, 2007

(86) PCT No.: PCT/EP2007/007705
§ 371 (c)(1),
(2), (4) Date: May 12, 2009

(87) PCT Pub. No.: WO2008/034518
PCT Pub. Date: Mar. 27, 2008

(65) Prior Publication Data
US 2010/0097269 A1    Apr. 22, 2010

(30) Foreign Application Priority Data

Sep. 20, 2006 (DE) .......................... 10 2006 044 231
Dec. 27, 2006 (DE) .......................... 10 2006 061 650

(51) Int. Cl.
*G01S 3/02* (2006.01)
*G06G 7/78* (2006.01)
(52) U.S. Cl. .......................... 342/451; 342/457; 701/302
(58) Field of Classification Search .................. 342/451, 342/457; 701/207, 300, 302
See application file for complete search history.

(56) References Cited

U.S. PATENT DOCUMENTS

| 6,047,234 | A | * | 4/2000 | Cherveny et al. ............. 701/200 |
| 6,104,344 | A | * | 8/2000 | Wax et al. ..................... 342/378 |
| 6,580,978 | B1 | | 6/2003 | McTamaney |
| 6,791,477 | B2 | * | 9/2004 | Sari et al. ................. 340/995.19 |
| 7,155,239 | B2 | * | 12/2006 | Zeng et al. ................. 455/456.1 |
| 2005/0113111 | A1 | * | 5/2005 | Dupont et al. ............. 455/456.1 |
| 2005/0197139 | A1 | | 9/2005 | Misikangas et al. |
| 2007/0184850 | A1 | | 8/2007 | Hupp et al. |

FOREIGN PATENT DOCUMENTS

| DE | 10 2004 035 531 A1 | 2/2006 |
| EP | 1 109 031 A1 | 6/2001 |
| EP | 1 274 058 A1 | 1/2003 |

OTHER PUBLICATIONS

Official communication issued in counterpart International Application No. PCT/EP2007/007705, mailed on Mar. 26, 2008.

(Continued)

*Primary Examiner* — Thomas Tarcza
*Assistant Examiner* — Cassie Galt
(74) *Attorney, Agent, or Firm* — Keating & Bennett, LLP

(57) ABSTRACT

An apparatus for localizing a position on a path, radio signals of fixedly positioned radio transmitters being receivable along the path, the apparatus including a determiner for determining properties of the radio signals of the fixedly positioned radio transmitters at the position, and a comparator for comparing the determined electromagnetic properties with previously recorded properties which characterize a reference path, and for determining a relation between the position and the reference path on the basis of a result of the comparison.

15 Claims, 15 Drawing Sheets

OTHER PUBLICATIONS

Connelly et al.: "A Toolkit for Automatically Constructing Outdoor Radio Maps," Information Technology: Coding and Computing, 2005; ITCC 2005; Apr. 4, 2005; pp. 248-253.

Chai et al.: "Reducing the Calibration Effort for Location Estimation Using Unlabeled Samples," Proceedings for the 3rd IEEE International Conference on Pervasive Computing and Communications; 2005 IEEE; Mar. 2005; pp. 95-104.

Ocana et al.: "Indoor Robot Navigation Using a POMPDP Based on WiFi and Ultrasound Observations," Intelligent Robots and Systems, 2005; Aug. 2005; pp. 503-508.

* cited by examiner higher-value results

| rq2>A | A<=rq3b<B | rq3b>=B | |
|---|---|---|---|
| RQ←RQ2 | RQ+←EM3b | yes rq1b3b>=C no | |
| | | RQ+←RQ1b3b | RQ+←RQ3b | lower-value results

| yes rq1b3>D(D) no | | | | |
|---|---|---|---|---|
| RQ-←RQ1b3 | yes rq1b3>E & rq3>F no | | | |
| | RQ-←RQ3 | yes rq1b>=G no | | |
| | | yes no | | RQ-←RQ1 |
| | | RQ-←RQ1b | RQ-←RQ1 | | single IP:

starting situation information:
"Keep going!"

information:
"taken wrong turning!"

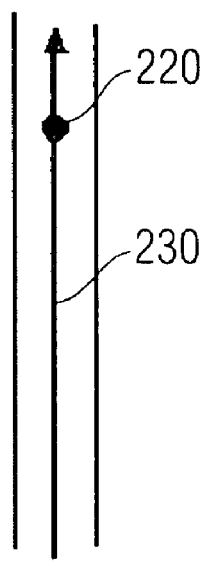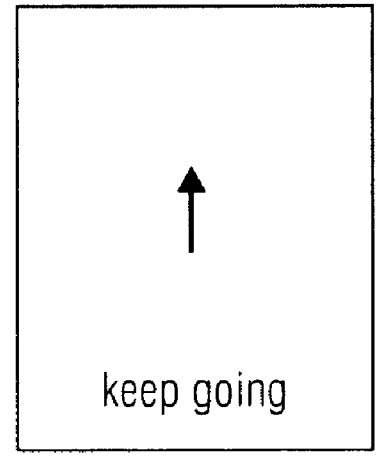
FIG 26A  FIG 26B
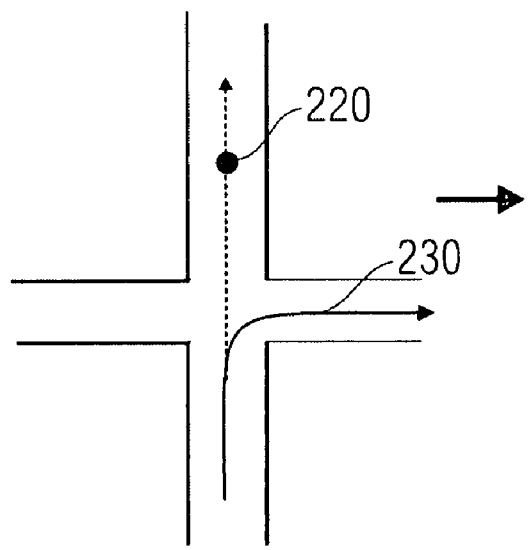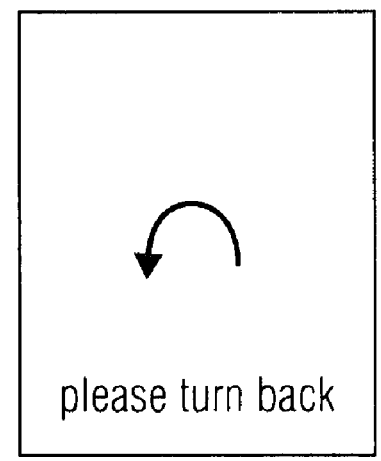
FIG 26C  FIG 26D

CONCEPT FOR LOCALIZING A POSITION ON A PATH

The present invention relates to a concept for localizing a position on a path, wherein radio signals may be received along the path from fixedly positioned radio transmitters, as it can be used in particular for localizing or navigating mobile terminal devices in a wireless communication network.

BACKGROUND OF THE INVENTION

Different location technologies are available for finding persons with mobile terminal devices. The most widely known system for outdoor localization or navigation, respectively, is the satellite-aided Global Positioning System (GPS). For localization or navigation within buildings or indoors, respectively, different approaches are known, like, for example, infrared systems, RFID systems or also field strength evaluations by IEEE 802.11 WLAN networks (WLAN=wireless local area network). The GPS system is currently only reliably available for outdoors. New developments, like highly sensitive receivers or the so-called A-GPS (assisted GPS) represent attempts to make the technology usable within buildings as well. A-GPS combines the use of the satellite-based GPS system with the reception of so-called assistance information from cellular mobile radio networks. Currently, these technologies do not yet have the desired average accuracies. Generally, infrared systems and RFID systems are not available everywhere and are tied to specific preconditions.

Due to the increasing distribution of wireless radio networks, which are, for example, based on the WLAN standard, these wireless networks are ideal as a basis for new localization methods.

Conventional localization methods used hitherto are, for example, based on triangulation, neighborhood relationships, lateration via time measurement or lateration via field strength assessment. These methods are localization methods where either a position of stationary transmitters or base stations has to be known or where training has to be performed in advance at typical positions in an environment to be covered by the localization method.

Guiding a user to a destination by means of a mobile device is generally achieved by determining the position of the mobile device and the destination. Subsequently, a path to be walked or driven along may be calculated from the relation of these two pieces of information.

If, for example, persons with mobile terminal devices or also self-sufficient systems, like, for example, automotive vehicles or robots, are in a strange environment and want to find other persons, defined places or objects or to be guided to the same, or, for example, be guided back to a starting point without complicated explanations of the way, and if the respective current positions of the persons and objects as well as a map of the environment are either not known or available, respectively, the above-described conventional localization or navigation methods will fail.

SUMMARY

According to an embodiment, an apparatus for localizing a position or for navigating on a path, radio signals of fixedly positioned radio transmitters being receivable along the path, may have: a comparator for comparing electromagnetic properties of the radio signals, which unambiguously identify a measurement point, so as to examine several reference paths, on the basis of common features of the electromagnetic properties, for an intersection point characterizing an identical geographic position in different reference paths, and to interconnect the reference paths to form a graph, intersection points and the current positions of terminal devices being regarded as nodes, and portions of paths between the intersection points and/or current positions of the terminal devices being regarded as edges of the graph, and a reference path being distinguished by a temporal succession of previously recorded electromagnetic properties of the radio signals of fixedly positioned radio transmitters; a determiner for determining a guidance path from the position to the intersection point, the determiner for determining the guidance path being configured to determine the guidance path by means of a routing algorithm on the basis of the graph; and a determiner for determining properties of the radio signals of the fixedly positioned radio transmitters at the position on the path, the determined properties of the radio signals including electromagnetic properties of the radio signals, the comparator being configured to compare the electromagnetic properties of the radio signals with previously recorded electromagnetic properties of the radio signals which characterize the guidance path, and to determine a relation between the position and the guidance path on the basis of a result of the comparison.

According to another embodiment, a method of localizing a position or for navigating on a path, radio signals of fixedly positioned radio transmitters being receivable along the path, may have the steps of: comparing electromagnetic properties of the radio signals, which unambiguously identify a measurement point, of several reference paths so as to search, on the basis of common features of the electromagnetic properties, for an intersection point characterizing an identical geographic position in different reference paths, a reference path being distinguished by a temporal succession of previously recorded electromagnetic properties of the radio signals of fixedly positioned radio transmitters;

interconnecting the reference paths to form a graph, intersection points and current positions of terminal devices being regarded as nodes, and portions of paths between the intersection points and/or current positions of the terminal devices being regarded as edges of the graph; determining a guidance path from the position to the intersection point by means of a routing algorithm on the basis of the graph; and receiving the radio signals of the fixedly positioned radio transmitters at the position on the path; determining properties of the radio signals of the fixedly positioned radio transmitters at the position on the guidance path, the determined properties of the radio signals including electromagnetic properties of the radio signals; and comparing the determined electromagnetic properties with previously recorded electromagnetic properties which characterize the guidance path; and determining a relation between the position and the guidance path on the basis of a result of the comparison.

According to another embodiment, a computer program may have: a program code for performing the method of localizing a position or for navigating on a path, radio signals of fixedly positioned radio transmitters being receivable along the path, wherein the method may have the steps of: comparing electromagnetic properties of the radio signals, which unambiguously identify a measurement point, of several reference paths so as to search, on the basis of common features of the electromagnetic properties, for an intersection point characterizing an identical geographic position in different reference paths, a reference path being distinguished by a temporal succession of previously recorded electromagnetic properties of the radio signals of fixedly positioned radio transmitters; interconnecting the reference paths to form a graph, intersection points and current positions of terminal devices being regarded as nodes, and portions of paths between the intersection points and/or current positions of the terminal devices being regarded as edges of the graph; determining a guidance path from the position to the intersection point by means of a routing algorithm on the basis of the graph; and receiving the radio signals of the fixedly positioned radio transmitters at the position on the path; determining properties of the radio signals of the fixedly positioned radio transmitters at the position on the guidance path, the determined properties of the radio signals including electromagnetic properties of the radio signals; and comparing the determined electromagnetic properties with previously recorded electromagnetic properties which characterize the guidance path; and determining a relation between the position and the guidance path on the basis of a result of the comparison, when the computer program runs on a computer.

The present invention is based on the finding that the position of a mobile radio receiver may be localized on a path if the path is marked by means of specific environmental features, in particular by means of the detection of properties of radio signals of fixedly positioned radio transmitters along the path.

According to embodiments, this is performed by determining the properties of the radio signals of the fixedly positioned radio transmitters at the position to be determined on the path, wherein, according to embodiments of the present invention, determining the properties is performed by recording and assessment methods on mobile terminal devices or fixedly installed servers which intelligently store and assess the specific environmental features. For orientation, radio signals of different stationary radio transmitters are used. According to embodiments of the present invention, the same may be WLAN, Bluetooth or GSM base stations. In advantageous implementations, a transmitting power of the stationary radio transmitters is constant or at least approximately constant. With a variable transmitting power, as occurs, for example, due to so-called power control mechanisms in an UMTS system (UMTS=universal mobile telecommunications system) or a WLAN network with power regulation, the inventive concept may be applied if the current transmitting power of a base station is known.

At the position to be localized, according to embodiments, signals of stationary radio transmitters are sought by means of a mobile radio receiver, and their network identification, like, for example, an MAC address (MAC=media access control) or Ethernet ID or cell identification and a respective signal characteristic of the radio signal emitted by the radio transmitter, like, e.g., a received field strength at the mobile radio transmitter, a received spectrum or a signal-to-noise distance, is stored. A time sequence of the identifications of the stationary radio transmitters with their associated measured signal properties corresponding to the covered path is characteristic for this path or trail, respectively. Here, the trail or path is merely characterized by a time sequence of measurement values, without indicating the position on a map of the environment into which these measurement values were integrated.

According to embodiments of the present invention, in order to be able to localize oneself on a path, the determined properties of the radio signals of the fixedly positioned radio transmitters at the current position of the mobile device are compared to previously recorded properties characterizing a reference path, which was covered before, and matches are sought. Using the matches, a relationship between the position and the reference path may be determined based on a result of the comparison of the determined properties to the previously recorded properties. It is important that the reference path (also referred to as "trail") is merely characterized by the time sequence of the determined properties of the radio signals. A trail may, in particular, do without any positional reference (e.g. determining of the trail in a coordinate system).

According to embodiments of the present invention, a user may be guided on the reference path by comparing properties of the radio signals at the current position to previously recorded properties of the reference path.

According to embodiments, a means for comparing and for determining a relationship between the position and the reference path is implemented to determine a measure of probability which indicates with what probability the current position of a user having the mobile device lies on the reference path. Here, the reference path may be a trail along which the properties of the radio signals of the fixedly positioned radio transmitters along the path were already recorded previously.

According to a further embodiment of the present invention, the reference path may also be determined by searching for intersection points of a plurality of trails, wherein the current position of a user and the intersection points found are passed on to a routing algorithm, in particular to a routing algorithm based on the Dijkstra algorithm, for calculating the reference path. Here, the intersection points form the nodes, the trails between the intersection points the edges in a graph to which the routing algorithm is applied. In this respect, an apparatus for localizing a position on a path according to embodiments comprises a means for rendering the determined properties of the radio signals along the paths for filtering, for example, RSSI values (RSSI=received signal strength indication) from the signals received from the stationary radio transmitters, in particular with a low-pass filter. Further, in this respect a means for comparing is implemented to compare part of the determined properties of a first path to previously recorded properties of a reference path or a second path, respectively, wherein the part refers to determined properties which are spaced apart from each other by a multiple of the predetermined time distance in which the properties were determined.

According to a further embodiment, the present invention provides an apparatus for localizing a position on a trail, wherein, along the trail, radio signals from fixedly positioned radio transmitters may be received, comprising a means for measuring properties of the radio signals of the fixedly positioned radio transmitters at the position, a means for transmitting the measured properties of the radio signals to a server, and a means for receiving localization information from the server, wherein the localization information is based on the relationship between the position and a reference path, wherein the relationship is based on a comparison of the measured properties to previously recorded properties characterizing the reference path. This may, for example, be a PDA (PDA=personal digital assistant) with a WLAN map or a mobile telephone for receiving the properties of the radio signals. The properties of the radio signals may then, for example, be transmitted to a central server in order to be compared to previously recorded and stored paths or to perform a search for intersection points of a plurality of trails by the comparison and to be able to determine a new reference path or localization information, respectively, based thereon.

Embodiments of the present invention provide a server for localizing a position on a trail, wherein, along the trail, radio signals of fixedly positioned radio transmitters may be received, comprising a means for receiving properties of the radio signals of the fixedly positioned radio transmitters at the position and a means for comparing the received properties to previously recorded properties characterizing a reference path, and for determining a relationship between the position and the reference path based on a result of the means for comparing and a means for transmitting localization information, wherein the localization information is based on the relationship between the position and the reference path.

Here, the server is, for example, implemented to receive signal properties measured by a mobile terminal device at predefined intervals ΔT, like, e.g., the network identification of a so-called access point or a base station, as well as its received field strength $RSSI_k(i\Delta T)$, wherein k indicates a radio transmitter and i the $i^{th}$ time interval. According to embodiments, the signal properties transmitted by the user terminal may then be stored in a central database, wherein the time sequence of the measured signal properties characterizes the route covered or driven by the user terminal and may thus be stored in the database as a reference path (in the following also referred to as "trail"). If the server receives new measurement values of radio signals from a user, previously recorded properties of radio signals may be retrieved from the database to compare the signal properties corresponding to the current position to the previously recorded signal properties of a reference path. Based thereon, a relationship between the current position and the reference path may, for example, be indicated in the form of an intersection point or a probability that the position is located on the trail.

It is an advantage of the present invention that the inventive concept for localizing a position may do without positional reference. Consequently, no maps of an environment or a data acquisition phase, like, e.g., learning with so-called RF fingerprinting (database with transmitter position in trilateration) may be used. A user may, for example, be guided by intuitive commands or by visualization (for example by colors indicating how well his or her own movement matches the trail) or also by audio signals.

It is a further advantage of the present invention that the inventive concept is easily understandable with little technical experience.

If comparing the determined properties of the radio signals at the position with the previously recorded properties characterizing a reference path is executed, for example on a central server, minimal computational requirements are made with regard to a mobile terminal device, like, for example, a PDA. Thus, the inventive concept may also be used, apart from PDAs and mobile telephones, for very small platforms without displays, like, e.g., wireless radio nodes in sensor networks, iPods, etc.

It is a further advantage of the present invention that an inventive localization or navigation system which, for example, includes a mobile terminal device and a server, may be used in any environment with wireless networks without any preparation and is additionally completely independent of a network technology. An exchange of reference path information may be preformed via any network. For applications of the inventive concept containing no guidance to a communication partner of the user, like, e.g., finding back to a car, no network access and no server for data exchange is may be employed, since all functionalities, i.e. determining the properties of the radio signals, comparing the determined properties to previously recorded properties and determining the relationship between the position and the reference path, may be executed on the mobile terminal device.

It is a further advantage of the present invention that no maps of the environment with coordinates are needed, which are frequently not available and have to be generated in a cost- and time-consuming way, in particular for an indoor area. With conventional guidance systems based on localization, maps of the environment may be employed to be able to identify passable ways. Otherwise, routes would be calculated which, due to obstacles, cannot be used as trails in practice. The inventive concept is freed from this requirement for maps of the environment, as only trails are considered which were already covered successfully by users. In particular, an assessment of real walking distances is also possible by the inventive concept without maps of the environment.

BRIEF DESCRIPTION OF THE DRAWINGS

Embodiments of the present invention will be detailed subsequently referring to the appended drawings, in which:

FIGS. 26a to 26d are examples of intuitive guidance by the guidance algorithm according to embodiments of the present invention.

DETAILED DESCRIPTION OF THE INVENTION

Figure 1:
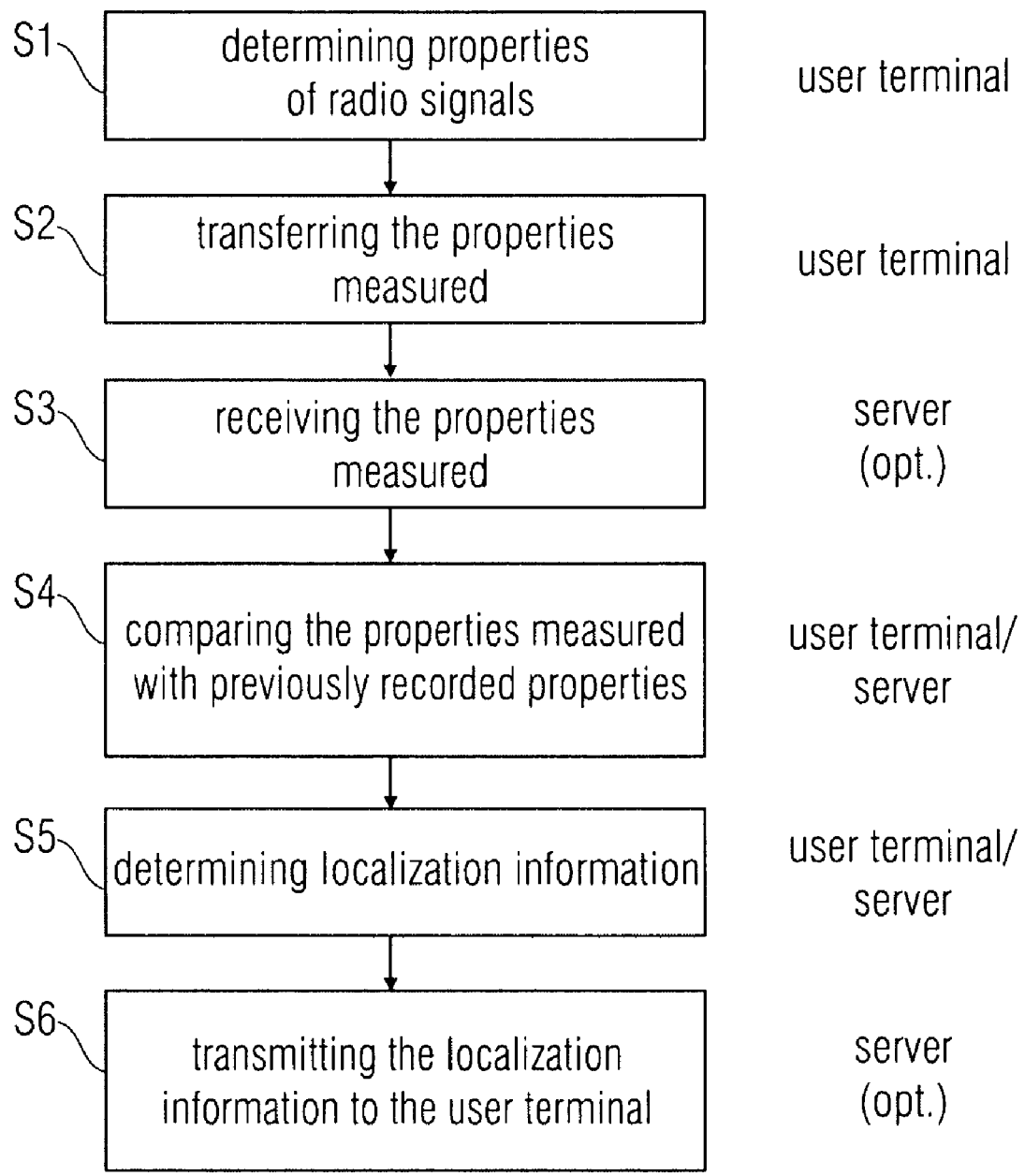
FIG. 1 is a flowchart for illustrating a method for localizing a position on a trail according to an embodiment of the present invention.

With regard to the following description, it should be noted that like or seemingly like functional elements have the same reference numerals in the different embodiments and that thus the descriptions of these functional elements are mutually interchangeable in the different embodiments illustrated in the following.

In the following, with reference to FIGS. 1 to 24, the inventive concept for localizing a position on a trail is described, wherein radio signals from fixedly positioned radio transmitters may be received along the path. In this respect, FIG. 1 first of all shows a flowchart for illustrating a method for localizing a position on a trail according to an embodiment of the present invention.

The method for localizing illustrated in FIG. 1 comprises a first step S1 of determining properties of the radio signals of the fixedly positioned radio transmitters at the position of the mobile device or client, respectively. Thereupon, according to embodiments, a second optional step S2 of transmitting the determined properties of radio signals to a server may follow. After the optional step S2 of transmitting, a further optional step S3 of receiving the transmitted determined properties of the radio signals from the server may follow. Thereupon, a step S4 of comparing the determined properties to previously recorded properties characterizing a reference path follows, and of determining a relationship between the position and the reference path based on the result of the comparison. According to an embodiment of the present invention, based on the result of step S4, localization information is determined in a step S5, wherein the localization information is based on the relationship between the position and the reference path. Finally, according to embodiments, the localization information may be transmitted in a step S6, e.g. from the central server to the client.

According to embodiments of the present invention, step S1 of determining the properties of radio signals is performed by a client, like, e.g., a WLAN-compatible PDA, a Bluetooth-compatible PDA or, e.g., also a mobile telephone. In this respect, the client comprises a means for determining or measuring the properties of the radio signals of fixedly positioned radio transmitters, wherein the properties are generally characterized by an identification of a fixedly positioned radio transmitter and its signal characteristic, like, for example, a received field strength, a received spectrum or a received signal-to-noise distance. The identification or an identifying feature, respectively, of a fixedly positioned radio transmitter may, for example, be its MAC address or a cell identification.

During a movement along a path or along a route, the properties of the radio signals of the fixedly positioned radio transmitters are determined at predefined intervals $\Delta T$ and combined to so-called measurement packages according to their time of determination $t=i\Delta T$. This is illustrated in FIG. 2.

Figure 2:
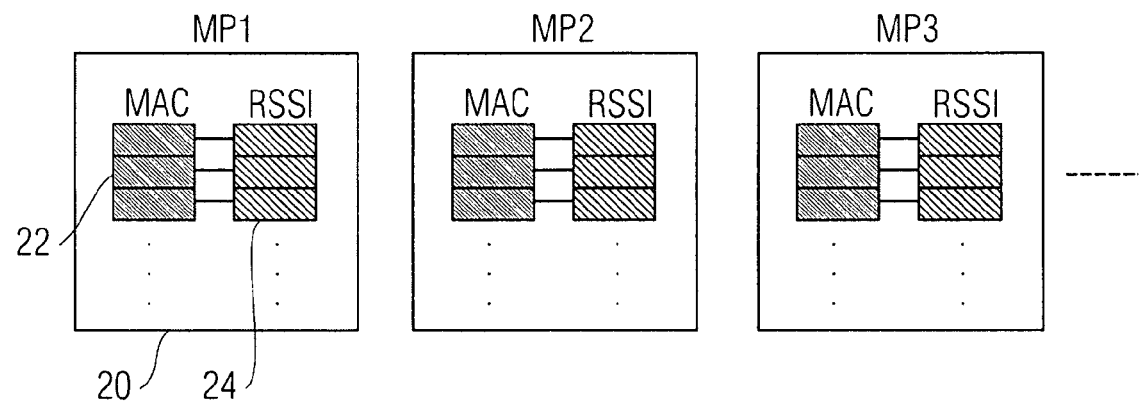
FIG. 2 is an exemplary sequence of measurement packages.

As an example, FIG. 2 shows three measurement packages from a WLAN network MP(1), MP(2), MP(3) subsequent in time, i.e. i=1, 2, 3, wherein a measurement package MP(i) comprises a plurality of MAC addresses 22 and associated RSSI values $RSSI_k(i)$, wherein the index k points to the $k^{th}$ radio transmitter. I.e., for each time interval i, which may lie in a range of 10 milliseconds to 10 seconds according to embodiments, the MAC addresses of the fixedly positioned radio transmitters and their RSSI values $RSSI_k(i)$ received by the client are combined to a measurement package MP(i).

The electromagnetic properties at each position or at each measurement point are referred to as so-called radio fingerprint as they usually uniquely identify this measurement point. If a client walks along a trail and records the measurement packages MP(i) along this trail at the points of time $t=i\Delta T$, then these measurement packages MP(i) uniquely characterize the covered path. This is exemplarily shown with reference to FIG. 3.

Figure 3:
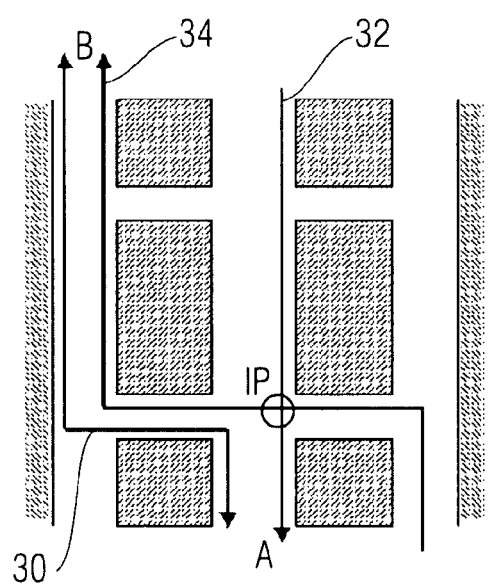
FIG. 3 is a schematical illustration of the mode of operation of a navigation via localization of a position on a trail according to an embodiment of the present invention.

In FIG. 3, two clients A and B are moving, for example within a building. The trail designated by reference numeral 30 connects the positions of clients A and B and the position of the intersection point IP of the two trails with each other. The line designated by reference numeral 32 designates the trail of client A, and the line designated by reference numeral 34 designates the trail of client B.

A trail represents the entirety of all measurement packages MP(i) determined in the order of their generation. A measurement package MP(i) again represents the electromagnetic properties of the location where the same was requested or measured, respectively. For example, every $\Delta T=200$ ms, a new measurement package MP(i) is determined. Via the trails 32 and 34 there is a connection between the routes [A, IP] and [B, IP]. Thus, the positions of clients A, B and the intersection point IP are in a certain relation to each other. This is, for example, a number of measurement packages or a time that may be derived there from, respectively. If, for example, the position of client A is placed on a coordinate 0, the coordinate of IP results from the number of measurement packages from A to IP and the coordinate of B from the number of measurement packages from A to IP plus the number of measurement packages from IP to B.

As the positions of A, B and IP illustrated in FIG. 3 are connected by trails characterized by measurement packages MP(i), and a measurement package MP(i) at least indirectly represents a geographical position, a first condition by which navigation is generally defined, i.e. the capability of being able to determine a geographical position, should therefore be fulfilled. A second condition may use a route between A and B to be calculated. Finally, a third condition may use guidance from A to B. Both the calculation of the route and also the guidance through a guidance algorithm will be described below. According to embodiments of the present invention, a client may transmit measurement packages determined by the same, for example to a central server, according to the optional step S2. If the server receives the characteristic properties transferred to the same by the client (optional step S3), the same may compare the determined properties to previously recorded properties that characterize a reference path already covered, and determine a relationship between the position and the reference path based on a result of the comparison (step S4). In this respect, according to embodiments, a client has a means for measuring properties of radio signals of the fixedly positioned radio transmitters at the position, a means for transmitting the measured properties to a server and further a means for receiving localization information from the server, wherein the localization information is based on the relationship between the position and a reference path, wherein the relationship is based on a comparison of the measured properties to previously recorded properties characterizing the reference path. Accordingly, according to embodiments, a server comprises a means for obtaining properties of radio signals of the fixedly positioned radio transmitters at the position and a means for comparing the determined properties to previously recorded properties characterizing a reference path and for determining a relationship between the position and the reference path based on a result of the comparison.

The inventive concept may, for example, be used so that communication partners having terminal devices with, for example, an IEEE 802.11 WLAN interface can find each other within a limited area. For this purpose, a WLAN network is installed in the limited area. The terminal devices may thus communicate with each other and additionally determine a received field strength of base stations or access points, respectively. The communication may, however, also be executed via any other technology. Finding each other takes place by matching or comparing received field strengths. With the information on approximate or accurate positions, respectively, and communication options possibly made available, finding each other becomes possible. Here, comparing the history of measurement values or measurement packages MP(i) of two communication partners (clients), intersection points between the respective trails of the clients are determined to subsequently be able to lead both clients to each other on the shortest possible path, as is schematically illustrated in FIG. 3.

Basically, a search for intersection points IP is a search for similar measurement packages in the broad trails. Thus, an intersection point defines a location or a position where both clients A and B have already been.

FIG. 2 shows an starting situation for a search for intersection points, i.e. a trail in its raw format of measurement packages MP(i). As has already been described above, information about the distance in the form of a number of measurement packages between point A and IP and also B and IP is important for navigation or indirect localization, respectively. This is why every measurement package MP(i) is first of all extended by the number i of its position within the trail.

Figure 4:
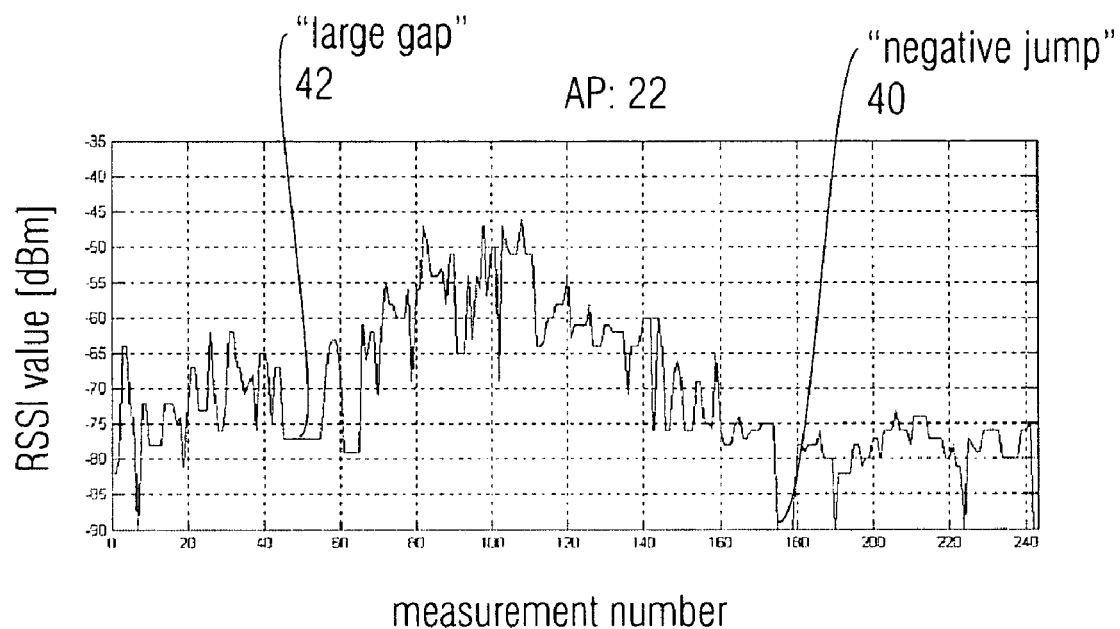
FIG. 4 is an exemplary waveform of a radio signal received from a fixedly positioned radio transmitter along a trail.

If a waveform of the received RSSI value in dBm of a fixedly positioned radio transmitter or access point k is considered, a waveform results as is illustrated exemplarily in FIG. 4. Position numbers i (measurement number) of the measurement packages MP(i) are plotted on the abscissa of FIG. 4. These values may also be directly converted into a time as, in a measurement interval of, for example, $\Delta T=200$ ms, exactly five measurement packages are determined in one second.

In the waveform illustrated in FIG. 4 a certain noise may be determined, which has a negative effect on results of a subsequent search for intersection points. The reason for this is that in the search for similar measurement packages in a reference path, the RSSI values $RSSI_k(i)$ of respective access points k of a measurement package are compared to each other. The actually relevant information lies in the envelope of the RSSI signal, which is why it is the aim of signal rendering to approximate this envelope as much as possible. According to embodiments, rendering takes place via a means for rendering the determined properties of the radio signals. Here, the means for rendering, depending on the application, may be located on the side of the client, on the side of the server, or on both sides.

It is important that both the waveforms $RSSI_k(i)$ of the individual access points k of a trail do not differ with regard to their length, and also that an RSSI value $RSSI_k(i)$ is associated with every measurement number i. The case "negative jump" designated exemplarily by reference numeral 40 in FIG. 4 occurs, for example, when, due to an overload, an access point may not provide a corresponding radio signal for the determination of the RSSI value at the client. If this case occurs, the means for rendering according to an embodiment of the present invention, is implemented to insert a so-called default value for this gap. I.e., the means for rendering is implemented to allocate a predetermined signal property to a radio signal of a stationary radio transmitter, if no signal property may be determined by the radio transmitter, to obtain the same number of determined properties each for each time interval for different radio transmitters at the position. If the signal properties are RSSI values and the radio transmitter is a WLAN access point, according to an embodiment of the present invention, for example −90 dBm is inserted as default value. Apart from that, if an access point within a trail is only visible for a short time, this default value is set as the measurement value for this access point at all further measurement times. Thereby, it may be guaranteed that all measured waveforms of different access points have the same length.

According to embodiments, a case "negative jump" designated by the reference numeral 40 in FIG. 4 is characterized in that two adjacent RSSI values $RSSI_k(i)$ and $RSSI_k(i+1)$ differ insofar as the RSSI value at the position i+1 is smaller by at least a predetermined value than the RSSI value at the position i. According to an embodiment of the present invention, the predetermined value $\Delta RSSI_k=12$ dB. To be able to guarantee that only relatively narrow or short downward "outliers" are filtered out, equating of two adjacent RSSI values $RSSI_k(i)$ and $RSSI_k(i+1)$ is repeated, according to one embodiment of the present invention, only maximally twice in a row to filter out the negative jump, even if the condition $RSSI_k(i+1)<(RSSI_k(i)-\Delta RSSI_k)$ were still fulfilled.

Figure 5:
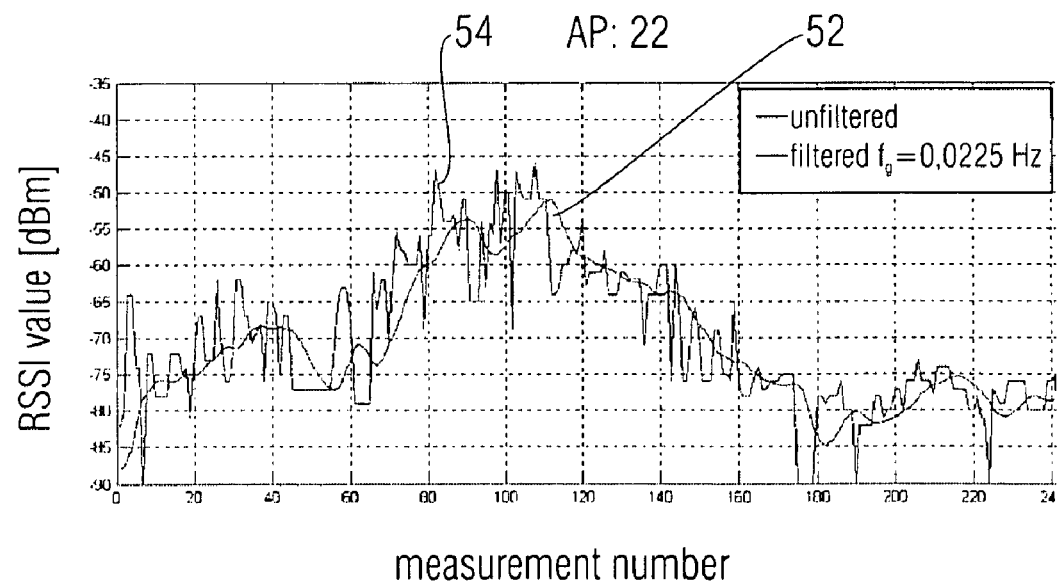
FIG. 5 is the waveform of FIG. 4 after negative signal jumps were filtered from the waveform.

A waveform in which negative jumps, as described above, were filtered out by signal rendering, is illustrated exemplarily in FIG. 5. FIG. 5 shows the RSSI waveform of FIG. 4, but without the negative signal jumps to the default value of −90 dBm, however. This is exemplarily designated by the reference numeral 50, wherein $RSSI_k(i)=RSSI_k(i+1)$.

According to one embodiment of the present invention, the means for rendering comprises a low-pass filter to enable smoothing of the RSSI signal curve illustrated in FIG. 5 by means of the low-pass filter. It is the task of the low-pass filter to remove unwanted noise portions from the signal. According to one embodiment of the present invention, a discretely realized Butterworth low-pass of the $2^{nd}$ order is used as low-pass filter. A Butterworth low-pass distinguishes itself by the fact that its transmission function below a cutoff frequency $f_g$ runs horizontally for a relatively long time and only then drops off steeply. This is advantageous to enable setting the cutoff frequency $f_g$ as low as possible even with a low order of the Butterworth low-pass filter. According to embodiments, the cutoff frequency $f_g$ is in a range of 0.2 Hz to 0.3 Hz. The curve designated by the reference numeral 52 in FIG. 5 describes the waveform of the low-pass filtered noisy signal 54 in which negative jumps 40 were already removed as described above.

Figure 6:
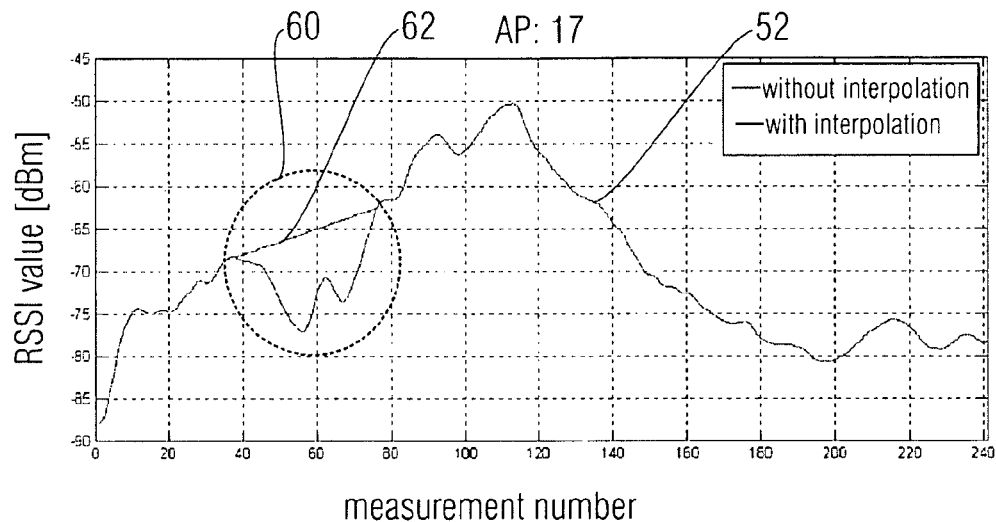
FIG. 6 is a low-pass filtered waveform of a received field strength of a radio signal from a fixedly positioned radio transmitter before and after an interpolation according to an embodiment of the present invention.

At times, WLAN maps have the problem that no field strength measurements are performed for a certain time. In this case, however, a WLAN map sets the RSSI value determined last as default until the field strength measurement functions again. This problem of a larger measurement gap is designated by the reference numeral 42 in FIG. 4. Due to the fact that a WLAN map does not operate correctly in the measurement gap area 42, such a measurement gap shows in the respective RSSI waveform $RSSI_k(i)$ of all access points located within the range of the WLAN map. This problem is most obvious when a waveform 52 of an already low-pass filtered RSSI signal is considered, as it is illustrated in FIG. 6.

The waveform 52 here erroneously describes a drop 60 of the signal due to a measurement gap by a measurement failure, which would strongly influence results of the following search for intersection points. To be able to prevent a corruption of the search for intersection points, such signal drops 60 due to measurement failures should be detected and a waveform should be accordingly interpolated at these positions, as it is illustrated by reference numeral 62. So that such an additional interpolation may be executed, the means for rendering further comprises a means for interpolating the average waveform. In this respect, first of all the exact area of such an area resulting from a measurement gap should be reliably detected. Relatively large inclinations of the waveform are characteristic for these positions (in FIG. 6 between measurement numbers i=40 to i=60 and i=65 to i=80), which allows a conclusion as to high values of the first derivation of the waveform 52 in relation to time.

Figure 7:
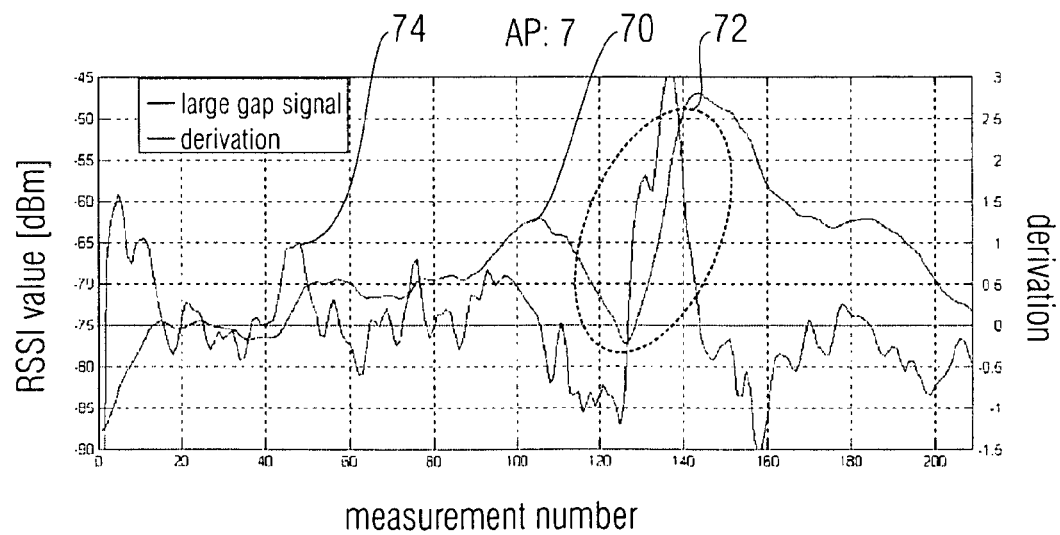
FIG. 7 is a low-pass filtered waveform and the time derivation of the waveform.

FIG. 7 shows a waveform 70 with a large gap designated by the reference numeral 72. Further, FIG. 7 shows the waveform of the first derivation in relation to time of the signal 70, designated by the reference numeral 74.

For an initial and a final value of an interpolation straight line with a large gap in the waveform 70, corresponding inflection points in the waveform may be used. These inflection points may also be determined by the detection of zero crossings in the waveform of the first derivation 74.

How a measurement gap area for an interpolation may be found, according to an embodiment of the present invention, will be explained in the following with reference to FIG. 8.

Figure 8:
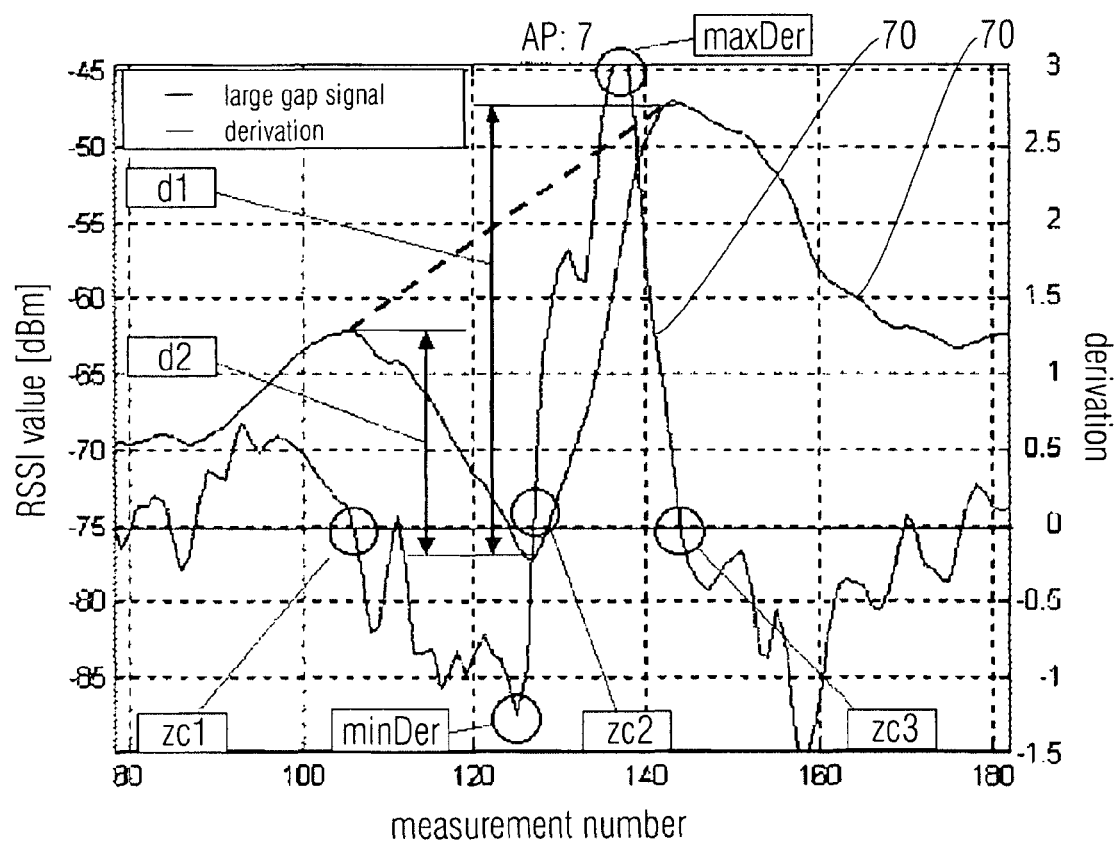
FIG. 8 is an enlarged waveform and its time derivation for explaining an interpolation according to an embodiment of the present invention.

In this respect, FIG. 8 shows an enlarged section of the waveforms 70 and 74 of FIG. 7, wherein the waveform 70 is the waveform of the low-pass filtered RSSI values and the waveform 74 is the corresponding first derivation of the waveform 70. FIG. 8 shows a first zero crossing zc1, a second zero crossing zc2 and a third zero crossing zc3 of the signal 74 of the derivation. Further, FIG. 8 shows a maximum maxDer between the second zero crossing zc2 and the third zero crossing zc3 from the signal 74 of the derivation and a minimum MinDer between the first zero crossing zc1 and the second zero crossing zc2 of the signal 74 of the derivation.

In order to find a measurement gap area for the interpolation, according to embodiments, a minimum MinDer and a maximum maxDer of the signal 74 of the derivation are sought among three adjacent zero crossings zc1, zc2 and zc3. The precondition for an interpolation is the fulfillment of two conditions.

If MaxDer and MinDer are each larger or smaller than certain boundary values, a first relationship is regarded as fulfilled. According to embodiments of the present invention, the used criteria are MaxDer>$X_1$ and MinDer<$X_2$ or MaxDer>$X_3$ and MinDer<$X_4$.

In other words, the means for rendering thus further comprises a means for interpolating the average waveform 70, wherein the means for interpolating is implemented to interpolate the average waveform 70 when a maximum maxDer between a second zc2 and third zero crossing zc3 of the derivation 74 of the waveform is greater than $X_1$, and a minimum minDer between a first zc1 and the second zero crossing zc2 of the derivation 74 of the waveform is smaller than $X_2$, or the maximum (maxDer) between the second zc2 and the third zero crossing zc3 of the derivation 74 of the waveform is greater than $X_3$ and the minimum (minDer) between the first zc1 and the second zero crossing zc2 of the derivation 74 of the waveform is smaller than $X_4$.

According to embodiments, $X_1$=0.5, $X_2$=−1, $X_3$=1 and $X_4$=−0.5. Obviously, other values are also possible.

In order to fulfill the second condition, a sum $d_1+d_2$ has to be greater than, for example, 10 dB, so that only greater gaps are processed, wherein $d_1$=|$RSSI_m$|=|$RSSI_{Start}$|, and $RSSI_m$ indicates the RSSI value of the signal 70 at the second zero crossing zc2 from the signal 74 of the derivation and $RSSI_{Start}$ indicates the RSSI value of the signal 70 at the position of the first zero crossing zc1 from the signal 74 of the derivation for the start of the interpolation. $d_2$ results from $d_2$=|$RSSI_m$|−|$RSSI_{end}$|, wherein $RSSI_{end}$ indicates the RSSI value of the signal 70 at the position of the third zero crossing zc3 from the signal 74 of the derivation for the end of the interpolation.

If both above-mentioned criteria are fulfilled, the interpolation may be executed. This is implemented according to embodiments by replacing all RSSI values in a range between the start $i_{start}$ of the interpolation according to the measurement number for the first zero crossing zc1 and the end $i_{end}$ of the interpolation according to the measurement number for the zero crossing zc3 with calculated RSSI values according to $$RSSI(i) = RSSI_{start} + \frac{(RSSI_{end} - RSSI_{start})}{(i_{ende} - i_{start})}(i - i_{start}) \quad (1)$$

The zero crossings of the signal 74 in the area of measurement number 110 in FIG. 8 are not considered according to embodiments, as otherwise the useful interpolation would not be executed correctly. In order to realize this, the distance between two adjacent zero crossings is assessed. If the distance is too small, these zero crossings are noted. Depending on whether the number of zero crossings lying too close to each other is even or odd, either all of them are removed or reduced to one zero crossing. In the case illustrated in FIG. 8, the number is two (with rising and falling edge), and thus both zero crossings are removed from the amount of zero crossings.

As has already been described above, the position on a trail may also be an intersection point between two trails. If an intersection point IP between two trails is to be found, in principle, any measurement package $MP_1(i)$ of a first trail may be compared to each measurement package $MP_2(i)$ of the second trail. This may include a high amount of computation. Thus, according to embodiments, when comparing the determined properties to previously recorded properties, merely part of the determined properties is compared to the previously recorded properties of a reference path, wherein the part consists of determined properties lying apart from each other by a multiple of the predefined time distance ΔT in which the properties were determined. For example, only every tenth measurement package of the first trail is sought for in all the measurement packages of the second trail. In this respect, FIG. 9 schematically shows a process for comparing or searching for intersection points, respectively, according to an embodiment of the present invention.

Figure 9:
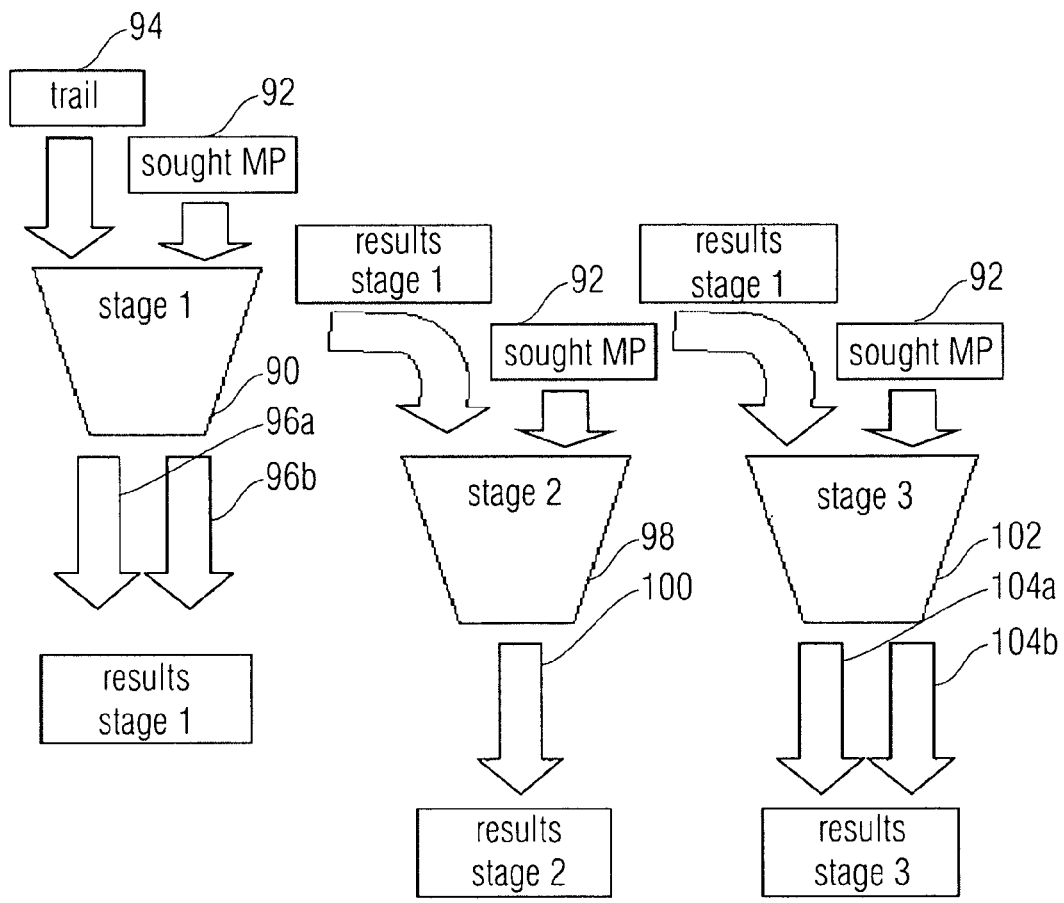
FIG. 9 is a diagram for explaining an algorithm for intersection point search or, respectively, for comparing determined properties to previously recorded properties which characterize a reference path, according to an embodiment of the present invention.

FIG. 9 shows three stages of an intersection point searching algorithm or IP algorithm, respectively, executed in step S4 of comparing by a means for comparing.

A sought-for measurement package soughtMP 92 of a first trail and an entirety of all measurement packages MP* 96 of the second trail are supplied to a first stage 90. By comparing the sought-for measurement package soughtMP 92 to the measurement packages MP* 94 of the second trail or the reference path, respectively, result quantities RQ1$a$ and RQ1$b$ are made available at the output of the first comparison stage 90, wherein the result quantity RQ1$a$ has a lower quality than the result quantity RQ1$b$.

According to embodiments, the result quantity RQ1$a$ may be supplied to a second comparison stage 98 to compare the measurement packages of the result quantity RQ1$a$ to the sought-for measurement package soughtMP 92 and thereupon provide a result quantity RQ2 at the output of the second comparison stage 98.

According to further embodiments of the present invention, the result quantity RQ1$a$ of the first comparison stage 90 together with the sought-for measurement package soughtMP 92 may be supplied to a third comparison stage 102 to obtain at its output a result quantity RQ3$a$ and a further result quantity RQ3$b$, wherein the result quantity RQ3$b$ comprises a higher quality than the result quantity RQ3$a$.

Each of the three comparison stages 90, 98, 102 may use at its input the sought-for measurement package soughtMP 92 and an amount of measurement packages, to which soughtMP may be compared. If a certain degree of similarity of one measurement package MP* from the amount of measurement packages exists with regard to soughtMP, then the respective measurement package MP* from the reference quantity is introduced into the result quantity of the respective stage. The reference measurement package MP* is extended by information regarding its similarity, which is designated by the different sub-quantities a and b at the output of the first comparison stage 90 and the third comparison stage 102. The result sub-quantity b here respectively describes a higher quality than the result sub-quantity a. It should be noted that all results of the first comparison stage 90 are passed on to the second 98 and the third comparison stage 102. The three comparison stages are different with regard to the type of filtering method, wherein the filtering criteria of the first comparison stage 90 are significantly softer. The first comparison stage 90 thus serves rather as a pre-stage for the two other comparison stages 98 and 102. As the second comparison stage 98 and the third comparison stage 102 are basically different with regard to their mode of operation, the respective results may be verified by the respective other stage. If possible, according to embodiments, the results of the second comparison stage 98 are used further. In principle, the result with the highest quality is advantageous.

In the following, with reference to FIGS. 10*a-c*, the modes of operation of the individual stages 90, 98 and 102 and the subsequent assessment of the results will be discussed.

Figure 10A:
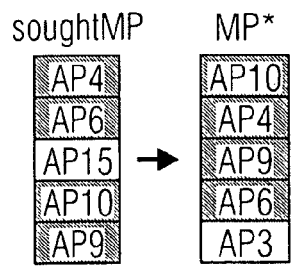
FIG. 10a is a diagram for explaining a first stage of the illustrated algorithm.
Figure 10B:
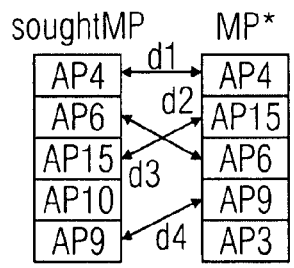
FIG. 10b is a diagram for explaining a second stage of the illustrated algorithm according to an embodiment of the present invention.

FIG. 10*a* shows an illustration of a sought-for measurement package soughtMP 92 and a measurement package MP* from the reference quantity 94.

As has already been described above, according to embodiments, the first comparison stage 90 distinguishes itself by relatively soft filtering criteria and forms a result quantity RQ1, with which the second comparison stage 98 and the third comparison stage 102 may continue to operate. Here, RQ1 includes the two result quantities RQ1$a$ and RQ1$b$. In FIG. 10*a*, only those access points of soughtMP and MP* are illustrated whose RSSI values count among the N highest ones of the respective measurement package. According to embodiments, N=5 is selected. Additionally, they are sorted in a descending order, so that the access point with the highest RSSI value is furthest to the top. For simplifying the illustration, in the following both soughtMP and also MP* are each reduced to five access points, wherein, of course, also more or less access points are possible in each case.

The filtering of the first comparison stage 90 first of all consists in checking how many access points from soughtMP are contained in MP*. According to one embodiment of the present invention the following four conditions should be fulfilled for passing the first comparison stage 90:

1. At least N−1 access points from soughtMP should be contained in MP*.
2. The strongest access point from soughtMP has to be among the strongest two from MP*.
3. The $N^{th}$ strongest access point from soughtMP may not be among the strongest two from MP*.
4. The second strongest access point from soughtMP has to be among the highest N−1 from MP*.

If these four conditions are considered as being fulfilled, the reference measurement package MP* will be allocated to one of the two result quantities RQ1$a$ or RQ1$b$, respectively, depending on the number of access points commonly contained in the two measurement packages soughtMP and MP*. If there are N matches, this will be result quantity RQ1$b$ according to embodiments, otherwise result quantity RQ1$a$. Supplying to the different result quantities means that MP* is extended by the information of its similarity to soughtMP.

Apart from the third comparison stage 102, the second comparison stage 98 is a stage with stronger filtering criteria compared to stage 90 and reduces the result quantity RQ1 passed on by stage 90 to those measurement packages having a respective similarity or quality, respectively, with regard to the sought-for measurement package soughtMP 92. FIG. 10*a* exemplarily shows a sought-for measurement package soughtMP 92 having five access points and one reference measurement package MP*, originating from the result quantity RQ1 of the first comparison stage 90. Filtering of the second comparison stage 98 is based on a comparison of the RSSI values of the access points or radio transmitters, respectively, commonly contained in the two measurement packages soughtMP and MP*. Since, as already described above, the radio transmitters are already ordered in a decreasing order of their RSSI values, in FIG. 10*b* access point AP4 and access point AP6 represent the strongest two radio transmitter of the sought-for measurement package soughtMP 92. Accordingly, the difference in magnitude $d_1$ of the RSSI values of AP4 from soughtMP and MP* and the difference in magnitude $d_2$ of the RSSI values of AP6 from soughtMP and MP* are weighted double, in order to take into consideration that the RSSI values may be measured more accurately the greater they are. Here, $d_x$ indicates the magnitude of the differences between the RSSI values of the respective radio transmitters from soughtMP and MP*, wherein x=1, ..., 5, wherein the strength of the radio transmitter in soughtMP is decisive for x. The above-described weighting is relevant for the determination of $d_m$, the average value of the differences in magnitude $d_x$. If, as illustrated in FIG. 10*b*, only four matches are determined in the first comparison stage 90, $d_m$ is, for example determined by means of $$d_m = \frac{2d_1 + 2d_2 + d_3 + d_4}{6}, \quad (2)$$

otherwise, for example, by means of $$d_m = \frac{2d_1 + 2d_2 + d_3 + d_4 + d_5}{7}. \quad (3)$$

Obviously, other forms of weighting the difference in magnitude $d_x$ are possible for forming the average value $d_m$. Thus, a standard deviation $\sigma$ of the differences in magnitude $d_x$ between the RSSI values of the respective radio transmitters to their average value $d_m$ results from $$\sigma = \sqrt{\frac{1}{N-1} \sum_{x=1}^{N} (d_x - d_m)^2}, \quad (4)$$

wherein N indicates the number of matches between soughtMP and MP*. If $\sigma$ remains below a certain limit, MP* has a similarity to soughtMP that may be useful after the second comparison stage 98 and is allocated to the result quantity RQ2 of the second comparison stage 98.

The means for comparing thus comprises a second comparison stage 98 which is implemented, using the result quantity of the first comparison stage 90, to determine a standard deviation $\sigma$ between the results of the result quantity and the sought-for measurement package according to equation (4), wherein $d_x$ indicates a magnitude of the difference between RSSI values of two identical stationary radio transmitters from the sought-for measurement package soughtMP and a reference measurement package MP* from the result quantity RQ1 of the first comparison stage, and $d_m$ indicates an average value of the differences $d_x$.

Figure 10C:
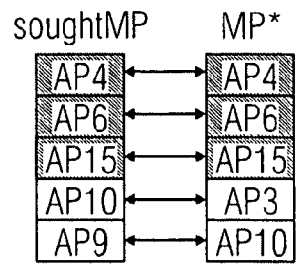
FIG. 10c is a diagram for explaining a third stage of the algorithm illustrated in FIG. 10 according to an embodiment of the present invention.

FIG. 10c shows an starting situation for the third comparison stage 102. This starting situation is the same for the third stage 102 and for the second comparison stage 98, which means that MP* is from the result quantity RQ1 of the first comparison stage 90 and that soughtMP and MP* are each sorted in a decreasing order according to the RSSI values of the radio transmitters contained in the measurement packages, and that at least four radio transmitters from soughtMP are also contained in MP*. The third comparison stage 102, similar to the first comparison stage 90, is based on an assessment of certain relations between the radio transmitters with regard to their positions of the respective measurement package, wherein here the comparison is made according to stronger criteria. In principle, it may be said that it is checked here whether the position of a radio transmitter from soughtMP corresponds to the position of the radio transmitter in MP*. If, as indicated in FIG. 10c, for example three matches are contained, a useful similarity between the measurement packages of the stage exists. If, for example, four or five matches exist, this will be further differentiated. The number of matches basically decides whether a result is allocated to the result quantity RQ3a (for example three matches) or RQ3b (more than three matches).

However, in general, this procedure may show weaknesses, when the RSSI values $RSSI_k(i)$ of the respective radio transmitters received by a client are similarly high at positions within a radio network. Basically, it may be said, that the smaller a difference between two RSSI values, the lower the significance of a relation between two radio transmitters as checked here will be assessed. For counteracting this fact, according to embodiments, when differences of the RSSI values are too low, blocks are formed within soughtMP which are subsequently processed separately. This procedure is illustrated in FIG. 11a.

Figure 11A:
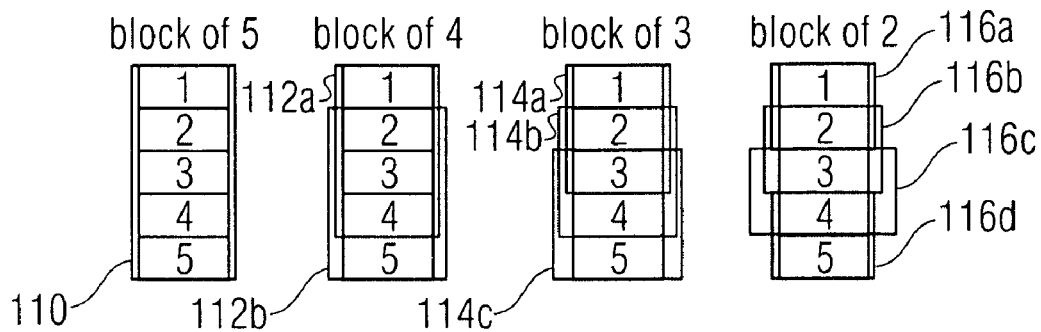
FIGS. 11a to 11c are diagrams for a more detailed explanation of the third stage of the illustrated algorithm according to embodiments of the present invention.

Blocks illustrated in FIG. 11a only relate to soughtMP. The numbers 1 to 5 indicated in the respective blocks represent the order positions of the radio transmitters with regard to their RSSI values. According to embodiments, the maximum difference of the RSSI values between the respective first and the respective last of a block corresponds to 1.7 dB. The value for the maximum difference of the RSSI values between the respective first and the respective last of a block, which is advantageously to be selected, basically depends on properties of the utilized technology. If, as is indicated by reference numeral 110, a block of five or a block of four (112a, 112b) may be determined in soughtMP, then the third comparison stage 102 remains blocked for the correspondingly sought measurement package soughtMP, as a further differentiation would bring no significant improvement as compared to the first comparison stage 90. In principle, these two cases may use a very high radio transmitter density and will thus be detected rather infrequently.

Further, according to embodiments of the present invention, the third comparison stage 102 will be blocked for a sought-for measurement package soughtMP, should the RSSI values of the radio transmitter at position 1 and the radio transmitter at position 4 in soughtMP not differ by more than 8 dB according to embodiments. Here, the invention is also not limited to this value, as this value may be selected depending on circumstances, like, for example, a utilized radio network technology.

If a block of three (114a, 114b, 114c) is determined, according to embodiments, it is only requested that a certain radio transmitter from MP* is part of the block in soughtMP, if this radio transmitter lies at a position within MP* which is bounded by this block regarding its position. This procedure will be explained in more detail with reference to FIG. 11b.

Figure 11B:
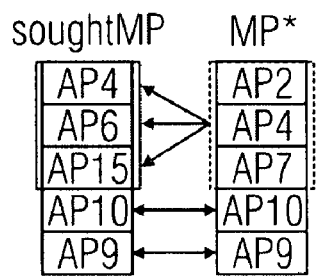
Figure 11C:
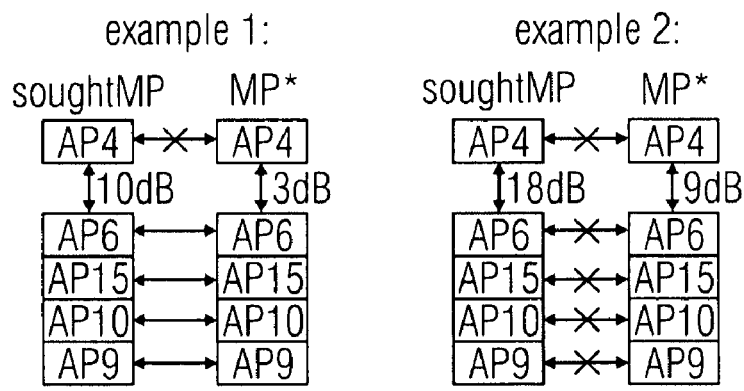

In the example illustrated in FIG. 11b, with regard to the formation of blocks, AP4, AP6 and AP15 could be combined to a block of three. AP4 of MP* may consequently be either first, second or third within soughtMP. The same applies for AP2 or AP7, respectively. In a block of two, the procedure is the same as in a block of three.

A further characteristic relation between two radio transmitters that are on top of each other regarding their RSSI values is a relatively large difference of the RSSI values. Thus, an already determined match, according to embodiments, may be devalued again, if this difference from soughtMP is not reflected in a similar amount in MP*. These circumstances are illustrated for a closer explanation in FIG. 11c.

In order for this relation between two radio transmitters that are on top of each other regarding their RSSI values to be assessed, according to embodiments, in soughtMP, two adjacent radio transmitters ought to differ by at least 8 dB. Should this be the case, then, according to embodiments, the difference between the same two radio transmitters in MP* should advantageously be two-thirds of the difference from soughtMP. This situation is illustrated in the left-hand partial image in FIG. 11c. As AP4 and AP6 from soughtMP differ by 10 dB, these two radio transmitters are at least 10 dB·3/2=6.6 dB apart in MP*. As this is not the case in the example illustrated in FIG. 11c, one of the already five matches is deleted again. If, as illustrated in the right-hand partial image of FIG. 11c, two radio transmitters from soughtMP are more than 12 dB apart, the third comparison stage 102 for this sought-for measurement package soughtMP 92 is blocked if the requested distance in MP* is not achieved.

The accuracy of the second comparison stage 98 may generally not be achieved by the third comparison stage 102. However, with a deterioration of boundary conditions, in particular with the use of two different radio cards, the third comparison stage 102 still provides good results.

In an assessment of the result quantity determined hitherto by the comparison stages 92, 98 and 102, the hitherto determined result quantities are regarded in a more differentiated way in order to increase the certainty of the results. This differentiation is mainly made with regard to the magnitude of the individual qualities and is established by the fact that a result, even if of higher quality, is afflicted with a certain uncertainty if not confirmed by further results of the same quality. In this respect, the quantities used hitherto are first of all regrouped and named accordingly.

RQS: result quantity of the second comparison stage 98
RQ3b: the better results of the third comparison stage 102
RQ3: all results from the result quantity of the third comparison stage 102
RQ1b: the better result quantity of the first comparison stage 90
RQ1: all results from the result quantity of the first comparison stage 90
RQ1b3b: all results from the intersection of RQ1b and RQ3b
RQ1b3: all results from the intersection of RQ1b and RQ3
RQ+: result quantity after the assessment for higher-value results
RQ−: result quantity after the assessment for lower-value results
RQ: resulting result quantity after the assessment.

The intersections of RQ1b and RQ3b or RQ1b and RQ3, respectively, are assessed so that, for example, a quantity RQ3b, which is as large as possible, may further be reduced by additional information from the first comparison stage 90 and thus the result may be improved. In order to keep the following structograms illustrated in FIGS. 12 and 13 as clear as possible, the number of elements of the individual quantities is named like the quantity itself but in small letters.

Figures 12, 13, 14:
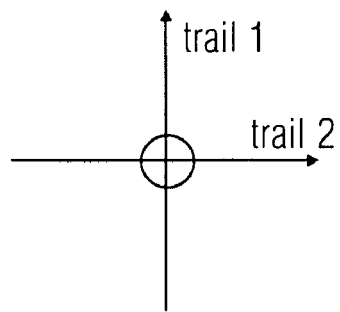
FIG. 12 is a structogram for assessing higher-value results of the illustrated algorithm according to embodiments of the present invention.
FIG. 13 is a structogram for assessing lower-value results of the illustrated algorithm according to embodiments of the present invention.
FIG. 14 is an illustration of an individual intersection point between two reference paths.

FIG. 12 shows a structogram for assessing higher-value results, if present.

In the assessment of the higher-value results illustrated by the structogram in FIG. 12, in the step of comparing the determined properties to previously recorded properties, an assessment result quantity RQ is formed based on results RQ2 of the second comparison stage 98, if the amount rq2 of the result quantity RQ2 of the second comparison stage 98 is higher than a predetermined value A. I.e. the means for comparing is implemented to form the assessment result quantity RQ based on results RQ2 of the second comparison stage if the volume rq2 of the result quantity of the second comparison stage 98 is greater than A. According to embodiments, A is equal to 3.

Further, in the step of comparing, the higher-value result quantity RQ+ is formed based on better results RQ3b of the third comparison stage 102, if the volume rq3b of the quantity RQ3b of the better results of the third comparison stage 102 lies between A and an upper value B>A. I.e., the means for comparing is implemented to form a higher-value result quantity RQ+ based on a better result quantity RQ3b of the third comparison stage 102, if the volume rq3b of the better result quantity RQ3b of the third comparison stage 102 is greater than or equal to A and smaller than B, wherein A<B. According to embodiments of the present invention, V=15, i.e. 3≦rq3b<15.

If the volume rq3b of the result quantity RQ3b of the third comparison stage is greater than or equal to B and if the volume rq1b3b of the intersection of the better results RQ1b of the first comparison stage 90 and the better results RQ3b of the third comparison stage 102 is greater than or equal to a predetermined value C, wherein C=2 according to embodiments, the resulting result quantity RQ+ results from RQ1b3b. I.e., the means for comparing is implemented to form the higher-value result quantity RQ+ based on the intersection RQ1b3 of the quantity of the better results RQ3b of the third comparison stage 102 and the quantity of the better results RQ1b of the first comparison stage, if the volume rq3b of the quantity of the better results RQ3b of the third comparison stage is greater than or equal to B and a volume of the intersection RQ1b3 is smaller than C. Further, the means for comparing is implemented to form the higher-value result quantity RQ+ based on the quantity of the better results RQ3b of the third comparison stage 102, if the volume rq3b of the quantity of the better results RQ3b of the third comparison stage 102 is greater than or equal to B and the volume rq1b3b of the intersection RQ1b3b of the better results (M3b) of the third comparison stage 102 and the better results RQ1b of the first comparison stage 90 is smaller than C. If the volume rq3b of the result quantity RQ3b is greater than or equal to B=15 and the volume rq1b3b<C=2, then, according to embodiments, the resulting result quantity RQ+ results from the result quantity RQ3b.

In order to obtain acceptable information, in particular with bad boundary conditions, the lower-value results of the first comparison stage 90 or the third comparison stage 102 are also accordingly assessed accurately. The way to reach the result quantity RQ− after the assessment of the lower-value results is illustrated in the structogram in FIG. 13.

The result quantity RQ−, after the assessment for lower-value results, corresponds to the intersection RQ1b3 of the better results RQ1b from the first comparison stage 90 to all results RQ3 from the result quantity of the third comparison stage 102, if the volume of the intersection rq1b3 is greater than a predetermined value D. I.e., the means for comparing is implemented to form the lower-value result quantity RQ− based on the intersection RQ1b3 of the result quantity RQ3 of the third comparison stage 102 and the quantity of the better results RQ1b of the first comparison stage 90, if the volume rq1b3 of this intersection RQ1b3 is greater than D and no higher-value results could be determined. According to embodiments, D=5.

If rq1b3>E (e.g. E=2), but rq1b3≦D, and if rq3>F (e.g. F=5), then the result quantity for lower-value results results from the result quantity RQ3. I.e., the means for comparing is implemented to form the lower-value result quantity RQ− based on the result quantity RQ3 of the third comparison stage 102, if the volume of the intersection RQ1b3 of the result quantity RQ3 of the third comparison stage 102 and the better results RQ1b of the first comparison stage 90 is greater than E and smaller than D and the volume rq3 of the result quantity RQ3 of the third comparison stage 102 is greater than F.

If the condition rq1b3>E and rq3>F is not met, the volume rq1b of the quantity of the better results RQ1b of the first comparison stage 90 is contemplated. If rq1b≧G, wherein G=5 in accordance with embodiments, and in addition rq1b>3*rq3, the result quantity RQ− will result for lower-value results from RQ1b, i.e. from the result quantity of the better results RQ1b of the first comparison stage 90. I.e., the means for comparing is configured to form the lower-value result quantity RQ− on the basis of the better results RQ1b of the first comparison stage 90 if the condition that the volume of the intersection RQ1b3 of the result quantity RQ3 of the third comparison stage 102 and of the better results RQ1b of the first comparison stage 90 be larger than E and smaller than D, and that the volume rq3 of the result quantity RQ3 of the third comparison stage 102 be larger than F, is not met, and if the volume rq1b of the quantity of the better results RQ1b of the first comparison stage 90 is larger than or equal to G, and the volume rq1b of the quantity of the better results RQ1b of the first comparison stage 90 is larger than 3*rq3.

If rq1b≧G, but rq1b≦3*RQ3, RQ− will result from RQ1. However, if rq1b<G, RQ− will also result from RQ1.

The values of A, B, C, D, E, F, and G described here are not to be regarded as limiting, of course. Rather, these values should be adapted to circumstances such as radio technologies used, for example.

If, in accordance with the assessments described in FIGS. 12 and 13, the result quantity RQ should contain no elements, the result quantity RQ will be formed from the result quantity RQ+ in accordance with the assessment for higher-value results. In the event that both RQ and RQ+ contain no elements, the result quantity RQ will be formed from the result quantity RQ− in accordance with the assessment for lower-value results. If none of the three result quantities RQ, RQ+ and RQ− contain any elements, the IP algorithm already described above will not have been able to determine a result.

For all of the result quantities RQ, RQ+ and RQ−, the average value of the measurement numbers of the reference packages MP* included is formed. These average values are designated as $RQ_m$, $RQ+_m$ and $RQ-_m$. In the averaging, the quality of the results is additionally taken into account for the calculation. A good result is weighted, for example, with the factor 10, a normal result is weighted, for example, with the factor 20, and a poor result is weighted, for example, with the factor 1, a good result corresponding to a result either from RQ2 or from RQ3b, a normal result corresponding to a result from RQ1b or RQ3, and a poor result corresponding to a result from RQ1. Factors other than the weighting factors mentioned here by way of example are also feasible. A poor result may further form as follows: if it was possible to allocate values to both the result quantity RQ and to the result quantity RQ+, the magnitude of the difference between $RQ_m$ and $RQ+_m$ will initially be determined. If this magnitude is larger than, e.g., 30, this result will be devalued and allocated to the poor results.

The methods introduced below are concerned with how certain movements of two terminal devices within a radio network, for example a WLAN network, may be inferred using specific patterns during the search for intersection points which was described above. With the information newly obtained therefrom, accuracy of the search for intersection points may be increased, on the one hand, and a better foundation may be provided, on the other hand, for subsequent route planning and/or route calculation in order to bring together the two clients.

A movement wherein both trails of the clients intersect in one point only is depicted in FIG. 14 by way of example. The above-mentioned reduction of the result quantity to a single result is achieved by averaging the respective measurement numbers from trail 1 (x values) and trail 2 (y values). The algorithm performing this additionally takes into account, in the calculation, the quality of the results which was already mentioned above. For example, a good result is weighted, e.g., with the factor 10, a normal result is weighted, e.g., with the factor 2, and a poor result is weighted, e.g., with the factor 1. This is depicted in FIG. 15.

Figure 15:
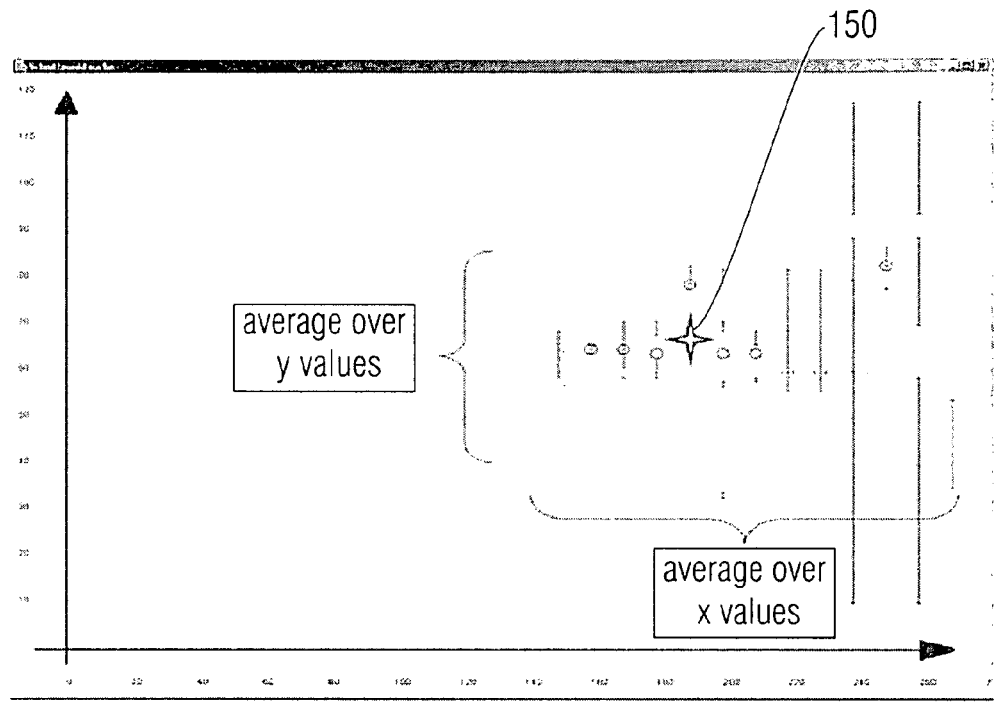
FIG. 15 is an illustration for explaining the averaging with a single intersection point between two reference paths according to an embodiment of the present invention.

The star bearing the reference numeral 150 in FIG. 15 symbolizes this replacement value, for which in the present example x was calculated to be 190, and y was calculated to be 67. The quality of this value is dependent on the quality of the results over which averaging was performed. In order to categorize the replacement value 150 accordingly, it is sufficient for one single result to be of higher quality than the others. The coordinates x=190 and y=67 here signify that the measurement package 190 of trail 1 best corresponds to the measurement package 67 of trail 2. Since the speeds of clients A and B may be considered to be at least approximately constant, a location may be determined by means of the speeds and the corresponding measurement numbers.

Figure 16:
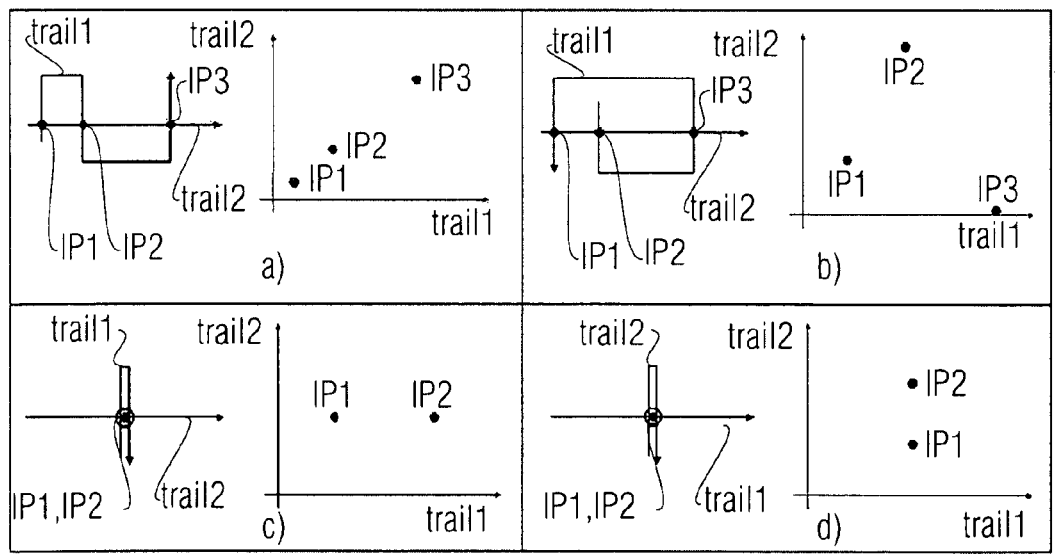
FIG. 16 is a schematical illustration of different movement patterns with two reference paths.

FIG. 15 reflects a movement pattern wherein the two trails, trail 1 and trail 2, intersect in one single point only. By contrast, FIG. 16 depicts various movement patterns wherein the two trails (trail 1 and trail 2) intersect at several points. Additionally, the intersection points to be expected are outlined within a coordinate system.

FIG. 16a shows a reference path 1, or trail 1, and a reference path 2, or trail 2, which mutually intersect at three intersection points IP1, IP2 and IP3. The first intersection point IP1 is relatively close to the start of the two paths, trail 1 and trail 2, which is why it is relatively close to the origin within the coordinate system shown in FIG. 16a. The intersection points IP2 and IP3 are located, on both trails, respectively, further apart from the respective starting point of the trail, and, thus, further apart from the origin. In FIG. 16b, things are different. Here, too, two paths, trail 1 and trail 2, intersect at three intersection points IP1-IP3. The intersection point IP1 is closest in time to the start of trail 1 and trail 2, respectively, which is why it is closest to the origin of the associated coordinate system. From the point of view of trail 2, the intersection point IP2 is quite close to its endpoint, but from the point of view of trail 1, it is approximately in the middle of the path thereof, which is why it is located relatively far "up" within the coordinate system. From the point of view of trail 2, the intersection point IP 3 is located at the beginning of the path thereof, and from the point of view of trail 1, it is at the end of the path thereof, which is why it is located at the bottom right within the coordinate system.

Sub-image FIG. 16c shows that both trails intersect twice at the same point. Sub-image FIG. 16d is similar, but here trail 1 and trail 2 have been swapped, so that the two intersection points IP1 and IP2 are one above the other rather than next to each other.

To be able to average the respective quantity of results in correspondence with FIG. 15 for each intersection point in the scenario depicted in FIG. 16c, the entire set of intersection points is advantageously separated into two sub-quantities. This process is referred to as so-called "horizontal clustering". The precondition for this is a minimum distance $\Delta x_{min}$ between the x values of two adjacent results. In accordance with embodiments, the minimum distance $\Delta x_{min}$=90. Two results are considered to be adjacent if they have been determined in temporal succession. For the scenarios depicted in FIG. 16a and FIG. 16b, three of these horizontal clusters would have to be formed in each case. The movement pattern depicted in FIG. 16c additionally demands that any sub-quantities resulting from horizontal clustering be subdivided even further. This is referred to as "vertical clustering". To this end, in accordance with embodiments, the result quantity of a horizontal cluster may be transferred to a specific algorithm. The mode of operation of said algorithm may be based, in turn, on the detection of a larger distance, the distance that may be useful between two y values being $\Delta y>100$ in accordance with embodiments.

Figure 17:
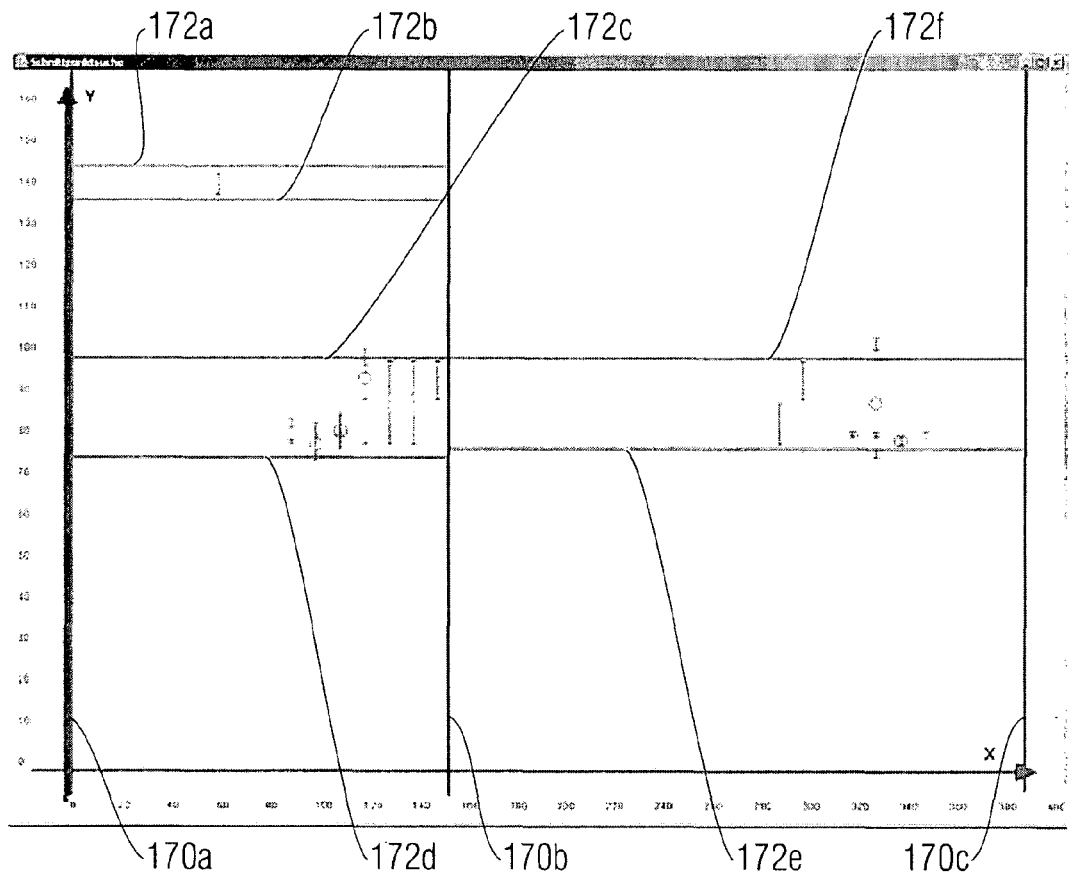
FIG. 17 is a schematical illustration of clusters of FIG. 16.

FIG. 17 represents horizontal clusters and vertical clusters of the movement pattern of FIG. 16c. FIG. 17 shows both the boundaries of the horizontal clusters 170a to c and the boundaries of the vertical clusters 172. In this example, the cluster at the top left is still to be filtered out, since it is located at a certain proximity to an adjacent cluster (center left) having a good result.

A reduction to a replacement value using methods in a "single IP scenario" with an actually existing "on-trail" situation is to be ruled out. Therefore, a distinction is initially made between these two cases in accordance with embodiments. In order to detect the "single IP" scenario, a standard deviation from the average value of the y values $y_i$ of all N results of the respective vertical cluster is calculated, and a decision is made on the basis thereof. In accordance with embodiments, the standard deviation $\sigma$ may be determined as follows:

$$y_m = \frac{1}{N} \sum_{i=1}^{N} y_i \qquad (5)$$

$$\sigma = \sqrt{\frac{1}{N-1} \sum_{i=1}^{N} (y_i - y_m)^2} \qquad (6)$$

Detection of the "on-trail" situation is performed only when no "single IP" situation could be made out, and said detection will be described below. If none of the two cases is made out, all of the results of the search for intersection points will be passed on to subsequent route planning.

Figure 18:
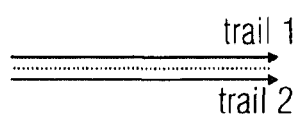
FIG. 18 is two superpositioned reference paths.

An "on-trail" situation is schematically depicted in FIG. 18. As was already explained above, this case describes a movement pattern wherein the two clients in their past traveled along entire segments of routes in the same or opposite directions. Since, again, there are different images or scenarios within the coordinate system in this context, they may also be contemplated in a discriminating manner so as to be able to determine desired regression lines. The most important movement patterns will be compiled by way of example in the following FIG. 19.

FIG. 19a describes a scenario wherein a first client has traveled, on a trail 1, along part of the segment of route of a second client with trail 2 in the same direction, the point p1_1 marking the point where the two trails merge, and the point p1_2 marking the point where the two trails diverge again.

FIG. 19b describes a similar scenario, but here the two trails are walked along in opposite directions in each case. As a result, the point p1_1 here marks a point which is located relatively close to the start of trail 1, but relatively close to the end of trail 2. The opposite applies to point p1_2, which is relatively far away from the end of trail 1 and relatively far away from the start of trail 2.

FIG. 19c describes a scenario wherein trail 1 and trail 2 are again walked along in opposite directions, and trail 1 additionally comprises a loop. In this manner, the downward-sloping straight line on the right-hand side of the straight line which was already described with reference to FIG. 19b forms a second time, as may be seen within the coordinate system of FIG. 19c.

FIG. 19d describes the scenario of FIG. 19a, except for the fact that here trail 2 contains a loop, so that the upward-sloping straight line above the straight line which was already described with reference to FIG. 19a comes up once again, as is shown in FIG. 19d.

Figure 19:
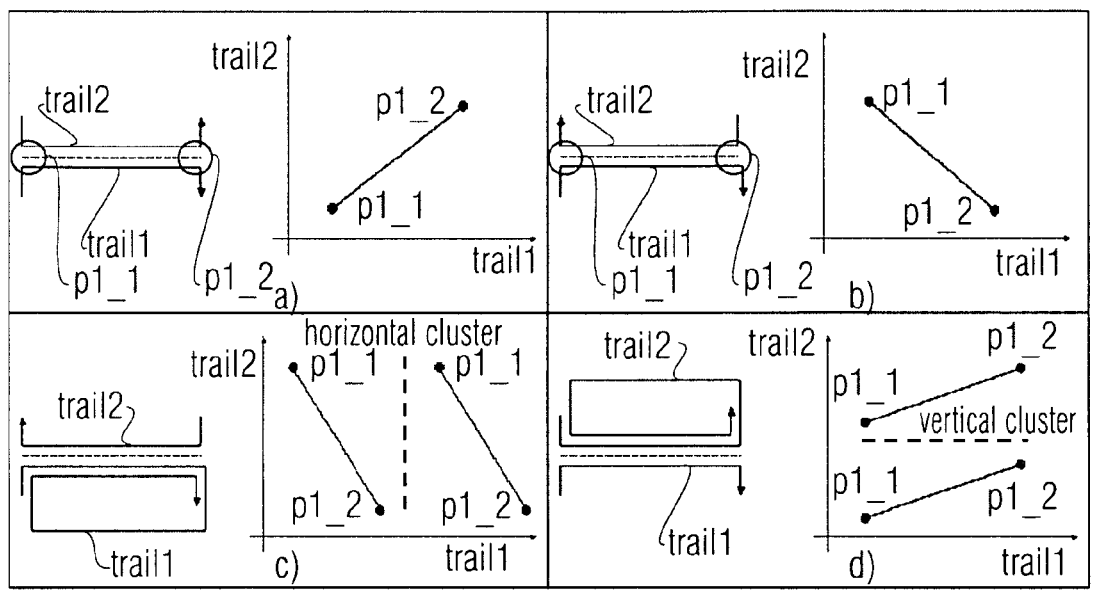
FIG. 19 is an illustration of different movement patterns with two reference paths partially superpositioned.

In FIG. 19a, both trails are walked along in the same direction, which results in that, ideally, the result quantity describes an upward-sloping straight line within the coordinate system. By contrast, the result quantity corresponds to a downward-sloping straight line when the trails are walked along in opposite directions (see FIG. 19b). One can see in FIG. 19c that trail 1 contains a loop, which is also true for FIG. 19d, except that here the loop is contained within trail 2. Since here there is only an upward-sloping or a downward-sloping straight line within a cluster, evaluation may be made by similar criteria when detecting the "on-trail" situations presented above. To this end, the points, or marks, p1_1 and p1_2 are used. The mark p1_1 is set to the first good result from the left-hand side, and the mark p1_2 is set to the first good result from the right-hand side. Certain relations between p1_1 and p1_2 regarding their x and y values decide, among other things, on whether one of the relatively simple patterns depicted in FIG. 19, or whether a more complicated pattern is present. If the pattern at hand is a simple one, verification is initially performed as to how well the respective result quantity would approximate a straight line. This may be achieved, in accordance with embodiments, using a calculation of a correlation coefficient in accordance with $$r = \sqrt{\frac{\sum_{i=1}^{n} x_i y_i - n \overline{x}\overline{y}}{\left(\sum_{i=1}^{n} x_i^2 - n \cdot \overline{x}^2\right)\left(\sum_{i=1}^{n} y_i^2 - n \overline{y}^2\right)}}, \qquad (7)$$

wherein in equation (7), y indicates the y value of a result, x indicates the x value of a result, $\overline{x}$ designates a value averaged over all n x values, and $\overline{y}$ designates a value averaged over all n y values. The basic precondition for this and for the equations described below for determining a regression line is that there may be at least three results. In addition, any poor results within a cluster will be removed if, for example, more than five good results exist within the cluster.

The n measurement points are located almost on a straight line whenever the correlation coefficient r differs only a little from −1 or 1. In the event of |r|=1, the measurement points are located exactly on a straight line. This connection will be explained in more detail in FIG. 20.

Figure 20:
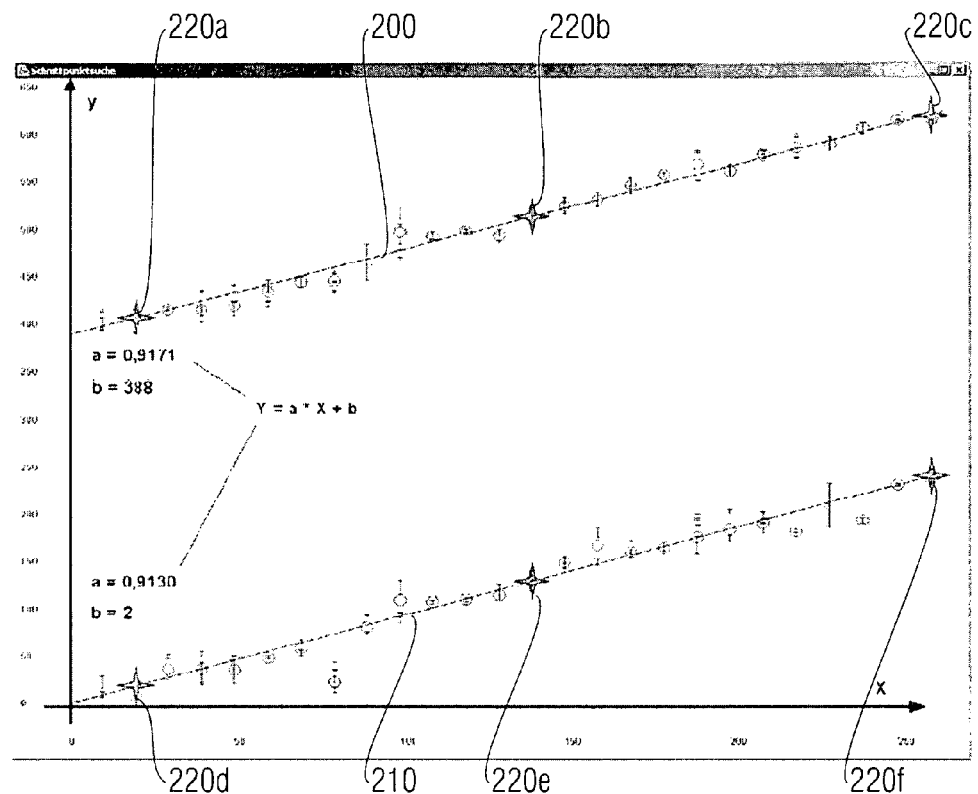
FIG. 20 is an illustration for a more detailed explanation of a cluster formation of possible results for intersection points between reference paths according to an embodiment of the present invention.

FIG. 20 shows a top regression line 200 and a bottom regression line 210. The correlation coefficient r has a value of 0.99 for the top straight line 200, and a value of 0.98 for the bottom straight line.

By means of the four subsequent equations (8) to (11), which are based on the Gaussian least-squares principle, parameters a (upward slope) and b (ordinate intersection point) of a regression line are initially calculated from the x and y values of the result quantity, so as to subsequently determine three replacement results which are marked, by way of example, as stars 220a-f in FIG. 20. They are located at the beginning, at the center and at the end of the result quantity, respectively, the x values of the marks p1_1 and p1_2 being used as a basis for the start and the end. In accordance with embodiments, only the good results are taken into account so as to obtain as sharp and precise a transition as possible upon entry into, or exit from, an on-trail situation. The quality is categorized as "good" for every replacement result in accordance with embodiments.

$$\Delta = n \cdot \sum_{i=1}^{n} x_i^2 - \left(\sum_{i=1}^{n} x_i\right)^2 \qquad (8)$$

$$a = \frac{n \cdot \sum_{i=1}^{n} x_i y_i - \left(\sum_{i=1}^{n} x_i\right) \cdot \left(\sum_{i=1}^{n} y_i\right)}{\Delta} \qquad (9)$$

-continued $$b = \frac{\left(\sum_{i=1}^{n} x_i^2\right) \cdot \left(\sum_{i=1}^{n} y_i\right) - \left(\sum_{i=1}^{n} x_i\right)\left(\sum_{i=1}^{n} x_i y_i\right)}{\Delta} \quad (10)$$

$$y = ax + b \quad (11)$$

To calculate a shortest path among an existing quantity of intersection points, a so-called routing algorithm is used in accordance with embodiments of the present invention. In this context, for example, an algorithm based on the known Dijkstra algorithm may be employed which demands a weighted graph as an input variable. Said graph consists of a quantity of points (nodes) and weighted edges connecting the nodes. With embodiments of the present invention, the intersection points determined and the current positions of the terminal devices are regarded as nodes, and the trails between the intersection points or current positions of the terminal devices are regarded as edges. Since there are different connections of the nodes over the various trails, the weight of the edges corresponds, in embodiments of the present invention, to a number of measurements between two nodes. If two nodes are not directly connected to each other, an edge will be used for this purpose all the same, which, however, bears the weight "infinite". I.e., an inventive apparatus for localizing a position further comprises, in accordance with embodiments, a means for determining a path toward a position on the reference path, the means for determining the path being configured to determine the path on the basis of a result of the comparison by means of the Dijkstra algorithm.

The Dijkstra algorithm determines, within a graph, the shortest connection from a starting point A to a destination point B. It stores, for each node K, the overall distance d(k) thereof from the starting point A, as well as the node p(K) from which it has been visited. Thus, after terminating the algorithm, the best path through the graph may be read out by tracing, in a stepwise manner, the respective ancestor nodes p(k) while starting from B.

Figure 21:
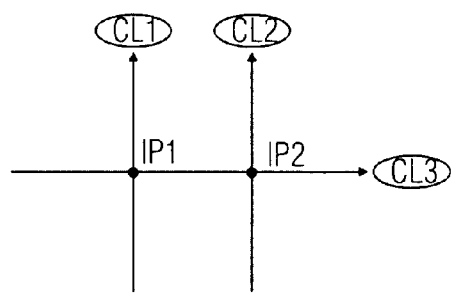
FIG. 21 is a schematical illustration for explaining keeping to a correct path direction.

A guidance trail determined by the Dijkstra algorithm is passed on, in accordance with embodiments, to a guidance algorithm which is to bring both terminal devices together. When the guidance trail is generated, sections of the trails of the terminal devices involved, which sections correspond to the results of the route planning of the Dijkstra algorithm, are linked together. In this context, care is to be taken to ensure that the sections are inserted in the useful operating direction. In this context, FIG. 21 shows a schematic representation of routes of three terminal devices CL1, CL2 and CL3, the route of CL1 intersecting the route of CL3 at an intersection point IP1, and the route of CL2 intersecting the route of CL3 at an intersection point IP2. In order to bring CL1 and CL2 together, the guidance trail for CL1 is composed as follows: CL1-IP1 (trail 1 backward)+IP1-IP2 (trail 3 forward)+IP2-CL2 (trail 2 forward). The guidance trail for CL2 may be structured accordingly: CL2-IP2 (trail 2 backward)+IP2-IP1 (trail 3 backward)+IP1-CL1 (trail 2 forward).

The guidance algorithm is to provide both terminal devices with any information useful for finding each other. This is accomplished essentially by determining whether or not the respective client is positioned on the guidance trail formed. Thus, the guidance algorithm serves, in accordance with the invention, to determine a relation between the current position of a terminal device and the reference path, or the guidance trail. In accordance with embodiments of the present invention, a guidance trail, or the reference path, may naturally also be a path which was previously traveled by a client himself/herself. Such a scenario is feasible, for example, when a user wants to find his/her way back to the starting point of the path after having traveled a specific path.

Figure 22A:
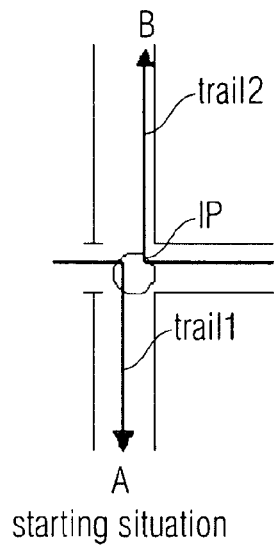
FIGS. 22a to 22c are schematical illustrations for explaining requirements with regard to a guidance algorithm.
Figure 22B:
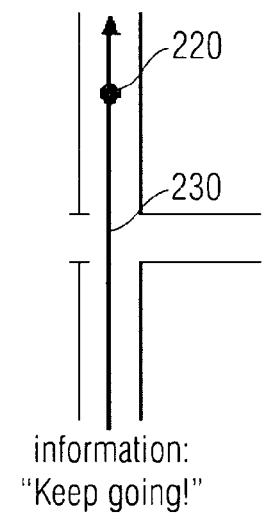
Figure 22C:
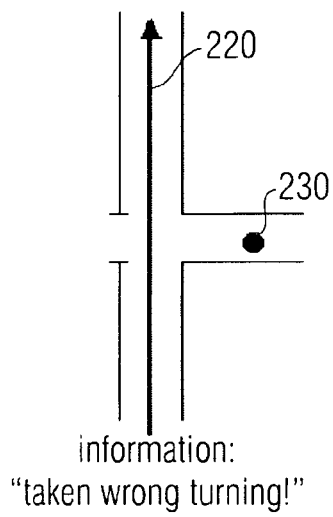

FIG. 22 provides an overview of various stages of finding a communication partner. FIG. 22a shows a starting position, wherein a client A has traveled along a path 1, or trail 1, and wherein a client B has traveled along a path 2, or trail 2, path 1 and path 2 intersecting, or contacting each other, at the intersection point IP. FIG. 22b shows a searching client 220 on his/her guidance trail represented as an arrow 230. For the scenario depicted in FIG. 22b, the guidance algorithm basically provides, in accordance with an embodiment of the present invention, information to the client 220 stating that he/she is on the right path and is to keep going. However, FIG. 22c shows a scenario wherein the client 220 has taken a wrong turning from his/her guidance trail 230. In this case, the guidance algorithm is to provide the client 220 with corresponding information.

The guidance algorithm communicates to a user where his/her approximate position within a specific section of the guidance trail is located. In this context, the section has a length of approx. 20 meters in accordance with an embodiment of the present invention. Within a predefined time interval, calculations are performed as to the levels of probability that the client is positioned in various areas of the section. To illustrate this connection, it is schematically depicted in FIG. 23.

Figure 23:
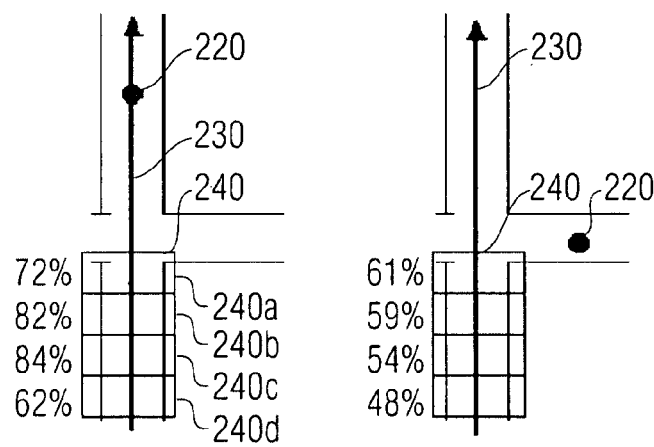
FIG. 23 is a schematical illustration for explaining probabilities which may occur and may be output according to an embodiment of the present invention.

FIG. 23 (left-hand side) depicts a client 220 who is situated on a guidance trail 230. The guidance trail 230 comprises a section 240 which, in turn, is subdivided into four portions 240a-240d. In the scenario shown in FIG. 23 (left-hand side) the client is located at a position within the portion 240b of the section 240 of the guidance trail 230.

FIG. 23 (right-hand side) shows a scenario wherein the client 220 is off the guidance trail 230. Accordingly, the client is not located within the section 240.

In the inventive guidance algorithm, the levels of probability that the client 220 is located in each of the four areas 240a-240d, depicted in FIG. 23, of the section 240 are calculated every 2 seconds, for example. If a user has the impression that he/she is positioned at the end of the section 240, a new section may be manually requested from the server, for example. If the guidance algorithm is executed on the server itself, the server may naturally also automatically send, in accordance with further embodiments of the present invention, a new section to the user or client. If the user moves away from the guidance trail or from the current section 240, as is shown in FIG. 22b by way of example, the values of the levels of probability will change, as is depicted in FIG. 22.

The precise steps of determining these levels of probability represented in FIG. 23 will be explained below in more detail.

The values determined for the levels of probability are important reference points for a user, since it is with them that the actual navigation takes place. For calculating the levels of probability, in accordance with the present invention, a client has a ring memory. This ring memory may store the 40 most recently determined measurement packages, for example. If the section 240 of the guidance trail comprises 100 measurement packages, for example, the content of the ring memory may be placed at four specific places over the section 240 of the guidance trail 230. It is predominantly by calculating a correlation coefficient of the respective signal patterns of the ring memory and the specific place over the section 240 that the levels of probability $\zeta_1$-$\zeta_4$ are determined. The correlation coefficient indicates the similarity between the two signals, in which context care should be taken to ensure that both signal patterns should advantageously have the same length.

If a client 220 moves away from the guidance trail 230, the values of the levels of probability will deteriorate only relatively slowly, since, although an update takes place every two seconds, for example, the measurement packages of, e.g., the last eight seconds are held in the ring memory. The length of these portions in the ring memory may not become too small, however, since otherwise an evaluation by means of the correlation coefficient will provide no useful results any more. In accordance with embodiments of the present invention, the correlation coefficient ρ' is calculated in accordance with $$\rho' = \frac{\sum (x[\vartheta] \lambda y[\vartheta])}{\sqrt{\sum x[\vartheta]^2 \cdot \sum y[\vartheta]^2}} \quad (15)$$

The correlation factor or correlation coefficient ρ' is a dimensionless variable for which $\rho'^2 \leq 1$ applies, which may be proven by the so-called "Cauchy-Schwarz inequality". If the RSSI values which are measured at a client are increased by the magnitude of the smallest RSSI value occurring, i.e. are increased by 90 dB, for example, the values to be expected for ρ' will be between 0 and 1. To avoid errors in calculating the correlation coefficients which are due to insufficient signal energies, only the signals of the five most powerful radio transmitters are evaluated in accordance with an embodiment of the present invention. An average value is formed from the resulting five correlation coefficients, so as to obtain a value for ρ'.

In accordance with further embodiments of the present invention, the means for comparing the properties determined with previously recorded properties which characterize a reference path, and for determining a relation between the position and the reference path on the basis of a result of the comparison is configured to determined a distance between two positions of two clients on a reference path. The distance may be determined using two different methods. On the one hand, a server may infer the positions of the two clients on the basis of those sections of the guidance trail which were last sent to both clients. However, this method exhibits a relatively high level of inaccuracy.

In addition, the server may calculate the precise positions, and the distance between the two clients which results therefrom, when both clients forward each measurement package determined to the server using an inventive means for determining properties of radio signals, said measurement packages being administered at the server, e.g. within a ring memory of a predetermined size, so as to obtain information on the respective position. This algorithm works in accordance with the methods of the search for intersection points which was already described above. In this context, the position of a client within a trail having a length of, e.g., 200 measurement packages and including the two sections, which have lengths of, e.g., 100 measurement packages, of the guidance trails of the two clients is calculated.

In summary, FIG. 24 once again shows the interaction between a client and a server for performing the inventive concept.

Figures 24, 25:
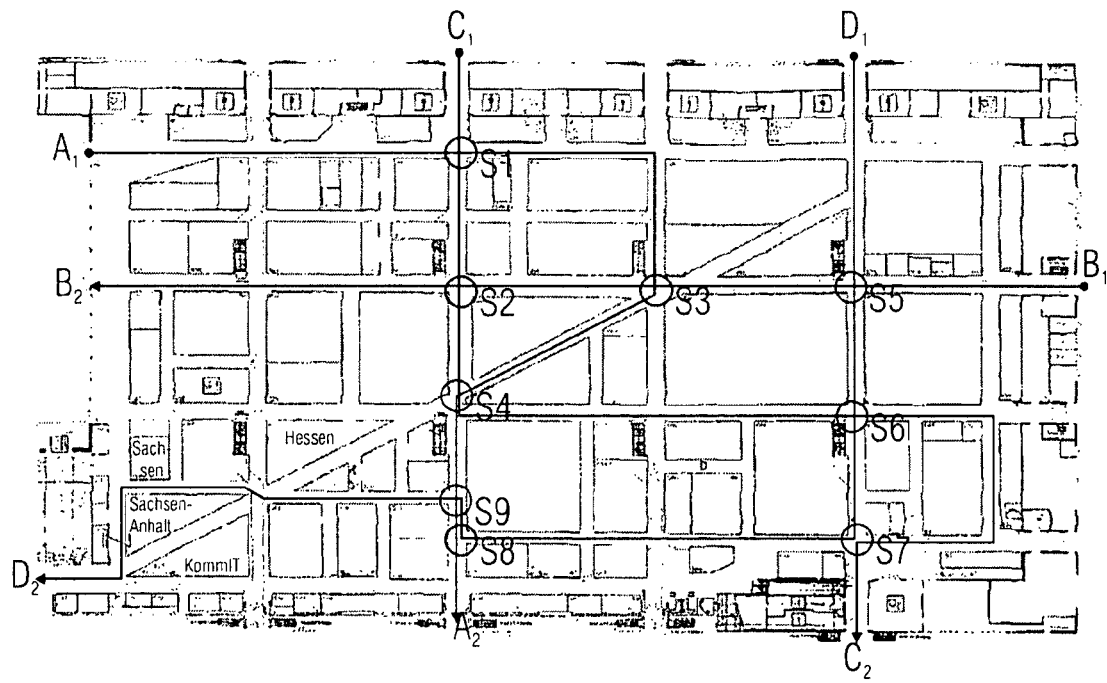
FIG. 24 is a block diagram of the cooperation between a client and a server.
FIG. 25 is a schematical illustration of four reference paths through a hall.

FIG. 24 shows a client 250 and a server 252. The client 250 has a means for measuring properties of radio signals of the fixedly positioned radio transmitters at the position of the client, and further has a means for communicating the properties measured to the server 252. In this manner, the measurement packages captured by the client 250 may be sent to the server individually. To this end, the server 252 comprises, in accordance with embodiments of the present invention, a means for receiving the properties measured. The server 252 is configured to administer the measurement packages, which are received from the client 250, separately from one another for each client involved in the form of so-called trails. To be able to perform a search for intersection points of two trails, the server 252 comprises, in accordance with embodiments, a means for comparing the determined properties of a first trail with previously recorded properties of a second trail, and for determining a relation between the individual positions of the first trail and the second trail on the basis of the comparison. The relation in this case will result, e.g., as an intersection point if the first and second trails intersect at at least one point. On the basis of the positions of the clients and the intersection points determined between the trails, the server may determine a guidance trail for each of the clients involved so as to bring the clients together. These guidance trails serve both clients as reference paths, respectively. Thus, in accordance with embodiments, the server is configured to communicate the guidance trail determined to the clients. In accordance with embodiments, the clients are configured to receive the guidance trail determined by the server. With this guidance trail or reference path, a client 250 is now able to compare the determined properties of radio signals of the fixedly positioned transmitter in his/her current situation with previously recorded properties of the reference path or guidance trail, and to determine a relation between the current position and the reference path on the basis of the comparison. This is performed in that the guidance algorithm, which was previously described, indicates the levels of probability. In accordance with embodiments of the present invention, the server 252 may utilize the current position, or the currently measured properties of the radio signals of a client, to determine, on the basis thereof and of the guidance trail, the distance from another client positioned on this guidance trail.

Thus, in accordance with a first aspect, the present invention provides a concept of tracing paths. In order to locate one's own position on a path, current measurement values are compared with previously recorded measurement values of the path, and a match is searched for by means of the previously mentioned search for intersection points. Once this match is found, a user can be guided from that point on. This means that the user is signaled to "keep going" as long as the match of the current measurement values and the previously recorded measurement values of the path is defined in a temporally successive form. If the current measurement values of the fixedly installed radio transmitters deviate too much from the path, or if the match concerning the path is going backward, a user will be signaled to "turn back", for example. This relation between the position and the reference path is accomplished by the guidance algorithm which has already been described above.

Since the path recorded is recorded during the movement of the user without any special instructions being given to the user, the route taken by the user may contain standstill phases and loops. Therefore, tracing may optionally be preceded by a processing phase. In this phase, the trail is examined for standstill phases in a first step. These are characterized in that the measurement values change only marginally, or fluctuate around average values, over a certain time period. The trail may be shortened at this point, so that the standstill phase is skipped during tracing. I.e., the means for comparing is configured, in accordance with embodiments, to examine the previously recorded properties, which characterize the reference path, for a loop and/or a standstill within the reference path, and to possibly remove these properties which correspond to the loop and/or the standstill.

In a second, optional step, loops are eliminated. A loop is characterized in that one location of the trail contains measurement values which occur once again in another location. The loop may be removed in that any measurement values between these two points are removed.

A variant of tracing a route traveled is to trace back one's own path (for example finding one's way back to a car, finding one's way back to a meeting point). In this context, a one's own route traveled is traced in an inverse temporal sequence.

In order to give other people the opportunity to follow a route, a path may be transmitted, in accordance with embodiments, from the device of a user to a second device. In this manner, the user of the second device may follow the route of the first user.

In accordance with a further embodiment, the present invention enables finding other persons or autonomous systems. To this end, partners continuously exchange their measurement data captured. In accordance with one embodiment, this may be performed via a central server or in a bidirectional manner, or peer to peer. In this manner, both devices know the route taken by the other partner. If the two partners want to meet, each partner, or the server, examines both trails for points of intersection, i.e. locations with similar measurement values on one's own route and the partner's route. This is performed, for example, in a backward manner starting from one end of the route so as to ensure that the most recent point of intersection will be found. Subsequently, both partners trace their own routes, respectively. If a partner arrives at the calculated point of intersection before the other partner, he/she will from now on follow the route of the other partner in a forward direction until both partners meet.

In this context, administration of the routes and the search for intersection points may be performed such that it is shared by the terminal devices. In accordance with a further embodiment, administration of the routes and the search for intersection points is performed centrally on one server. This is dependent on the circumstances and on the computing capacities of the systems involved.

The inventive concept may be upgraded into a multi-user system or a multi-path system of one or several users. In this case, several users continuously exchange their measurement data, or send it to a server. The individual trails are examined for mutual intersection points. This results in an intermeshed graph, the nodes of which are the points of intersection, and the edges of which are the sections of the path between the intersection points. If the elimination, which was already described above, of loops and standstill phases is employed, and if an approximately identical movement speed is presupposed, the length of the section of the path will be a measure of the spatial distance of the intersection points. If a first user at his/her first position wants to meet up with a second user at a second position, a route through the graph will be calculated for each user, the route consisting of sections of a path on which the users are led. Known methods, such as the Dijkstra method which is described in detail in the literature, are available for calculating the route on graphs. In this manner, a distance from a destination may also be estimated at any time. By means of this concept, a database may be created which may be used globally, for example, for bringing terminal devices together without any map material.

The inventive concept may be upgraded such that semantic information is stored at specific points in time. This may be the name of a tourist attraction which is being passed, for example, or, e.g., information stating that, at the current position, there is a cash machine, or any identifier of a meeting point which is to be found again in the future. This information is stored as information points in a route, and from then on forms independent points, so-called "points of interest" in the previously described routing graph. Other users of the system may now let themselves be guided to these points.

Finally, three possibilities of applying the inventive concept will be provided.

For example, a user parks his/her car in a car park in a city he/she does not know. Upon leaving the vehicle, he/she switches his/her mobile terminal device, which may be a mobile telephone or a PDA with WLAN function, to a tracing mode. Subsequently, the user visits tourist attractions of the city. At the end of his/her tour, the user wants to find his/her way back to the car. He/she switches his/her device into a guidance mode and subsequently is given instructions such as "Keep on walking" or "Other direction". In an optimized manner, the device guides him/her back on his/her own path, i.e. it eliminates loops and stopover times. For this case of application, no data exchange with a server or any other mobile device needs to be conducted.

In a second example of application, a user switches on his/her mobile terminal device and connects to a server via an access network. For example, a routing graph which contains routes and crossing points of previous users is already stored on the server. A user has stored a place designated "Lorenzkirche" (St. Lawrence's Church). The user selects the point "Lorenzkirche" from a display of tourist attractions and is guided by acoustic or visual output.

In a third example of application, automotive robots are employed as terminal devices. A routing graph containing routes and crossing points of other robots or previous journeys is stored, for example, on the server. The robots exhibit ambient sensors, such as cameras, by means of which they recognize environmental features. For orientation purposes, the robots link environmental features with points in the routing graph. In this manner, the robots may explore their environment, record environmental features, and (spatially) relate them to one another via the routing graph in an autonomous manner. The advantage of this method over a full map of environmental features consists in the considerably reduced memory expenditure and in the rapid navigability through the routing graph. A user may subsequently send a robot directly to an environmental feature. In addition, distances between environmental features may be inferred from the routing graph. It is also possible to let oneself, as a user carrying a portable terminal device, be guided to an environmental feature.

Further possibilities of application, for example in the area of finding a partner, are feasible. User profiles on users are stored. In the event of matching profiles, two partners are informed and may let themselves be guided to a meeting point. The distance between the two partners is estimated on the basis of the length of the trail.

Because of its character, the inventive concept is also suitable, in particular, for outdoor games with a high interaction factor. There is the possibility, for example, of searching for one another and of leaving messages and signs at specific points.

In summary, one aspect of the present invention will be presented once again with reference to FIG. 25.

FIG. 25 shows four trails through a hall (A, B, C, D). The trails extend from A1 to A2, from B1 to B2, from C1 to C2, and from D1 to D2, and form the intersection points S1 to S9.

If the user B at his/her location B2 wants to meet up with the user C (current location C2), a route through the graph will be calculated for each user, said route consisting of trail sections on which the users are guided. Known methods such as the Dijkstra method, which is described in detail in the literature, are available for calculating the route on graphs. In this manner, the distance from the destination may be estimated at any time.

In the example, the user B is guided via S2, S4, S6, and S7, and the user C is guided in the opposite direction. Where they will eventually meet depends on the traveling speed of the users.

In the example depicted in FIG. 25, the trails are drawn in a map, but actually the intermeshed graph is initially without any fixed positional reference.

A basic property of this approach is that the method manages without any positional reference. It basically comprises navigation without localization.

As a result, neither maps of the environment, nor a data acquisition phase (learning phase in fingerprinting, database with transmitter position in trilateration) need to be used. The user may be guided, for example, by intuitive commands (e.g. "Keep going", "Other direction") or by visualization (e.g. colors which indicate how well one's own movement matches the trail) or by audio signals (e.g. similar to a metal detector). One example of intuitive guidance is shown in FIG. 26.

FIG. 26a shows a client 220 on his/her guidance trail depicted as an arrow 230. For the scenario shown in FIG. 26a, the guidance algorithm provides, in accordance with an embodiment of the present invention, intuitive information to the client 220 stating that he/she is on the right path and is to keep on walking, as is shown, by way of example, in FIG. 26b. For example, FIG. 26b could be a representation on the display of a PDA or a mobile phone.

FIG. 26c shows a scenario wherein the client 220 has moved away from his/her guidance trail 230. In this case, the guidance algorithm also is to provide the client 220 with corresponding, intuitive information (e.g. "Please turn back"), which is shown in FIG. 26d by way of example. FIG. 26d could also be a representation on the display of a PDA or a mobile phone, for example.

In terms of its operation, the system is easily intelligible (following the principle of "Topfschlagen", a children's finding game) even for users with little technical know-how, and places minimum requirements upon the mobile terminal device. Thus, the method may also be employed, in addition to PDAs and mobile phones, for minuscule platforms without displays, such as wireless radio nodes in sensor networks, iPods, etc. The system may be used, without any preparatory work, in any environment with wireless networks, and it is entirely independent of network technology. Trail information may be exchanged via any network. For applications which contain no guidance to a partner, e.g. finding one's way back to the car, no network access and no server need to be used in order to exchange data.

Another important advantage is managing without maps of the environment, which are often not available and, in particular for inner cities, may be prepared with a large amount of effort. With a guidance system based on a localization system as is described in conventional technology, maps of the environment may be used in order to identify passable paths. Otherwise, routes would be calculated which are not possible to be used as routes in practice. The method described breaks away from this requirement of maps, since it includes only such paths into the system which have already been successfully traveled by a user. In particular, estimation of real walking distances without any map of the environment is also possible by means of this system.

The system may easily be upgraded in that semantic information can be stored at certain points in time. This may be, e.g., the name of a tourist attraction which is being passed, the information stating that there is a cash machine at hand, or any identifier of a meeting place to be found again in the future. This information is stored as information points in the trail and from then on forms independent points in the abovementioned routing graph. Other users may now let themselves be guided to this point.

In particular, it shall be noted that, depending on the circumstances, the inventive concept may also be implemented in software. Implementation may be performed on a digital storage medium, in particular a disc or a CD having electronically readable control signals which may cooperate with a programmable computer system and/or microcontroller such that the respective method is performed. Generally, the invention therefore also consists in a computer program product having a program code, stored on a machine-readable carrier, for performing the inventive method, when the computer program product runs on a computer and/or microcontroller. In other words, the invention may therefore be realized as a computer program having a program code for performing the method, when the computer program runs on a computer and/or microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for localizing a current position of a terminal device or for navigating the terminal device on a guidance path, radio signals of fixedly positioned radio transmitters being receivable along the path, the apparatus comprising:

a comparator arranged to compare previously recorded electromagnetic properties of the radio signals of the fixedly positioned radio transmitters, which unambiguously identify a measurement point, so as to examine several reference paths to search for an intersection point on the basis of common features of the previously recorded electromagnetic properties, wherein the intersection point characterizes an identical geographic position in different reference paths, and to interconnect the reference paths to form a graph, the intersection point and the current position of the terminal device being regarded as nodes, and portions of paths between the intersection point and the current position of the terminal device being regarded as edges of the graph, and a reference path being distinguished by a temporal succession of the previously recorded electromagnetic properties;

a guidance path determiner arranged to determine the guidance path from the current position to the intersection point, the guidance path determiner being configured to determine the guidance path by use of a routing algorithm on the basis of the graph, the guidance path having associated previously recorded electromagnetic properties; and a properties determiner arranged to determine current properties of the radio signals of the fixedly positioned radio transmitters at the current position of the terminal device, the current properties of the radio signals comprising electromagnetic properties of the radio signals of the fixedly positioned radio transmitters; wherein the comparator is configured to compare the current electromagnetic properties of the radio signals with the previously recorded electromagnetic properties of the radio signals associated with the guidance path, and to determine a relation between the current position of the terminal device and the guidance path on the basis of a result of the comparison.

2. The apparatus as claimed in claim 1, wherein the properties determiner is configured to determine a received field strength, a received power spectrum, and/or a signal/noise power ratio of the radio signals at the current position of the terminal device.

3. The apparatus as claimed in claim 1, wherein the properties determiner is configured to determine, from the properties determined, a transmitter identification identifying a fixedly positioned radio transmitter.

4. The apparatus as claimed in claim 1, configured to learn about the current transmitting power of a fixedly positioned radio transmitter.

5. The apparatus as claimed in claim 1, wherein the apparatus further comprises a processor arranged to process the determined electromagnetic properties of the radio signals.

6. The apparatus as claimed in claim 5, wherein the processor is configured to associate a predetermined electromagnetic signal property with a radio signal of a stationary radio transmitter if no electromagnetic signal property of the radio transmitter may be determined, so as to acquire an identical number of determined electromagnetic properties per time interval ΔT for a plurality of radio transmitters at the position, respectively.

7. The apparatus as claimed in claim 5, wherein the processor is configured to set $RSSI_k(i+1)=RSSI_k(i)$ if $RSSI_k(i+1)<(RSSI_k(i)-\Delta RSSI_k)$, wherein $RSSI_k(i+1)=RSSI_k(i)$ may only repeat itself twice for two successive measurement values, and wherein $RSSI_k(i)$ is a measure of an electromagnetic field strength, determined at the current position of the terminal device at the $i^{th}$ measurement value, of a radio signal of a $k^{th}$ stationary radio transmitter, and wherein $\Delta RSSI_k$ is a redetermined value.

8. The apparatus as claimed in claim 5, wherein the processor comprises a low-pass filter to be able to determine an average waveform of the electromagnetic properties of the radio signals of the stationary radio transmitters.

9. The apparatus as claimed in claim 8, wherein the processor further comprises an interpolator arranged to interpolate the average waveform, the interpolator being configured to interpolate the average waveform when:
  a maximum between second and third zero crossings of a derivation of the waveform in relation to time is larger than a value $X_1$ and when a minimum between a first and the second zero crossings of the derivation of the waveform is smaller than a value $X_2$, or
  when the maximum between the second and third zero crossings of the derivation of the waveform is larger than a value $X_3$, and when the minimum between the first and second zero crossings of the derivation of the waveform is smaller than a value $X_4$.

10. The apparatus as claimed in claim 1, wherein the comparator is configured to associate, with a sought-for measurement package of field strengths which corresponds to the current position of the terminal device on the path, N stationary radio transmitters which at the position comprise the highest N field strengths, and to place the N stationary radio transmitters comprising the highest N field strengths at the position into an order in accordance with the field strengths, and to then compare the sought-for measurement package with a measurement package, which was previously determined accordingly, of one of the reference paths.

11. The apparatus as claimed in claim 10, wherein the comparator identifies, via a first comparison stage, a similarity between the sought-for measurement package and the reference measurement package precisely when at least the N radio transmitters of the sought-for measurement package are comprised within the reference measurement package, and when the strongest radio transmitter from the sought-for measurement package is among the two strongest radio transmitters of the reference measurement package, and when the $N^{th}$ strongest radio transmitter of the sought-for measurement package is not among the two strongest radio transmitters from the reference measurement package, and when the second strongest radio transmitter from the sought-for measurement package is among the N−1 strongest radio transmitters from the reference measurement package, wherein with a similarity found the respective reference measurement package is used to determine a result quantity of the first comparison stage.

12. The apparatus as claimed in claim 11, wherein the comparator further comprises a second comparison stage configured to determine, with the result quantity of the first comparison stage, a standard deviation between the result quantity of the first comparison stage and the sought-for measurement package in accordance with $$\sigma = \sqrt{\frac{1}{N-1}\sum_{x=1}^{N}(d_x - d_m)^2},$$

wherein $d_x$ signifies a magnitude of the difference between RSSI values of two identical stationary radio transmitters from the sought-for measurement package and a reference measurement package from the result quantity of the first comparison stage, and dm signifies an average value of the differences $d_x$.

13. The apparatus as claimed in claim 1, wherein the comparator is configured to check the previously recorded electromagnetic properties characterizing one of the reference paths for a loop and/or a standstill within the reference path, and to remove these electromagnetic properties which correspond to the loop and/or the standstill, if need be.

14. A method of localizing a current position of a terminal device or for navigating the terminal device on a guidance path, radio signals of fixedly positioned radio transmitters being receivable along the path, the method comprising:
  comparing previously recorded electromagnetic properties of the radio signals, which unambiguously identify a measurement point, of several reference paths so as to search, on the basis of common features of the previously recorded electromagnetic properties, for an intersection point, wherein an intersection point characterizes an identical geographic position in different reference paths, a reference path being distinguished by a temporal succession of previously recorded electromagnetic properties of the radio signals;
  interconnecting the reference paths to form a graph, an intersection point and a current position of the terminal device being regarded as nodes, and portions of paths between the intersection point and the current position of the terminal device being regarded as edges of the graph;
  determining the guidance path from the current position to the intersection point by use of a routing algorithm on the basis of the graph, the guidance path having associated previously recorded electromagnetic properties; and receiving the radio signals at the current position of the terminal device on the guidance path;

determining current properties of the radio signals at the current position of the terminal device on the guidance path, the current properties comprising electromagnetic properties of the radio signals; and comparing the current electromagnetic properties with the previously recorded electromagnetic properties associated with the guidance path; and determining a relation between the current position of the terminal device and the guidance path on the basis of a result of the comparison.

15. A non-transitory computer readable medium storing a computer program comprising program code for performing when the computer program runs on a computer, the method of claim 14.

* * * * *

UNITED STATES PATENT AND TRADEMARK OFFICE
CERTIFICATE OF CORRECTION

PATENT NO. : 8,174,447 B2
APPLICATION NO. : 12/441984
DATED : May 8, 2012
INVENTOR(S) : Karin Loidl et al.

It is certified that error appears in the above-identified patent and that said Letters Patent is hereby corrected as shown below:

Column 31, Lines 37 and 38 should read as follows:

"$k^{th}$ stationary radio transmitter, and wherein $\Delta RSSI_k$ is a predetermined value"

Signed and Sealed this
Eighteenth Day of September, 2012

David J. Kappos
*Director of the United States Patent and Trademark Office*